United States Patent [19]

Nakamura et al.

[11] Patent Number: 5,668,695
[45] Date of Patent: Sep. 16, 1997

[54] PORTABLE COMPUTER UTILIZABLE BY AN OVER HEAD PROJECTOR AND TILTING MECHANISM THEREOF

[75] Inventors: Fusanobu Nakamura, Yamato; Rieko Kataoka, Sagamihara; Kenshin Yonemochi, Kamakura, all of Japan

[73] Assignee: International Business Machines Corp., Armonk, N.Y.

[21] Appl. No.: 610,650

[22] Filed: Mar. 4, 1996

[30] Foreign Application Priority Data

Mar. 3, 1995 [JP] Japan ................................. 7-043925

[51] Int. Cl.$^6$ .................... G06F 1/16; H05K 7/14
[52] U.S. Cl. ................. 361/683; 361/680; 361/681; 353/122; 353/DIG. 5
[58] Field of Search ...................... 361/680–683; 364/708.1; 353/122, DIG. 3, DIG. 5, 119, 120; G06F 1/16

[56] References Cited

U.S. PATENT DOCUMENTS

| | | | |
|---|---|---|---|
| 5,103,376 | 4/1992 | Blonder | 361/680 |
| 5,202,844 | 4/1993 | Kamio et al. | 364/709.11 |
| 5,353,075 | 10/1994 | Conner et al. | 353/122 |
| 5,359,550 | 10/1994 | Chen | 364/708.1 |
| 5,521,660 | 5/1996 | Hodson et al. | 353/122 |

FOREIGN PATENT DOCUMENTS

| | | | |
|---|---|---|---|
| 636773 | 1/1988 | Japan | H05K 5/02 |
| 636774 | 1/1988 | Japan | H05K 5/02 |
| 6322777 | 2/1988 | Japan | H05K 5/02 |
| 64121 | 1/1989 | Japan | G05F 1/00 |
| 2143620 | 12/1990 | Japan | G06F 1/00 |
| 31184 | 1/1991 | Japan | G06F 9/00 |
| 325211 | 5/1991 | Japan | G06F 1/16 |
| 3282441 | 12/1991 | Japan | G03B 21/132 |
| 416824 | 1/1992 | Japan | G02F 1/133 |
| 628057 | 2/1994 | Japan | G06F 1/16 |
| 2177395 | 2/1994 | Japan | H05K 5/02 |

Primary Examiner—Leo P. Picard
Assistant Examiner—Lynn D. Field

[57] ABSTRACT

It is one object of the present invention to provide a portable information processing apparatus that can be employed with an overhead projector (OHP).

A portable information processing apparatus according to the present invention comprises: a main body having a keyboard on an upper face; a lid having an internally mounted liquid crystal display panel and being hinged rotatably with the main body at the rear edge of the main body; and a tilting mechanism for positioning the front edge of the main body higher than its rear edge.

2 Claims, 22 Drawing Sheets

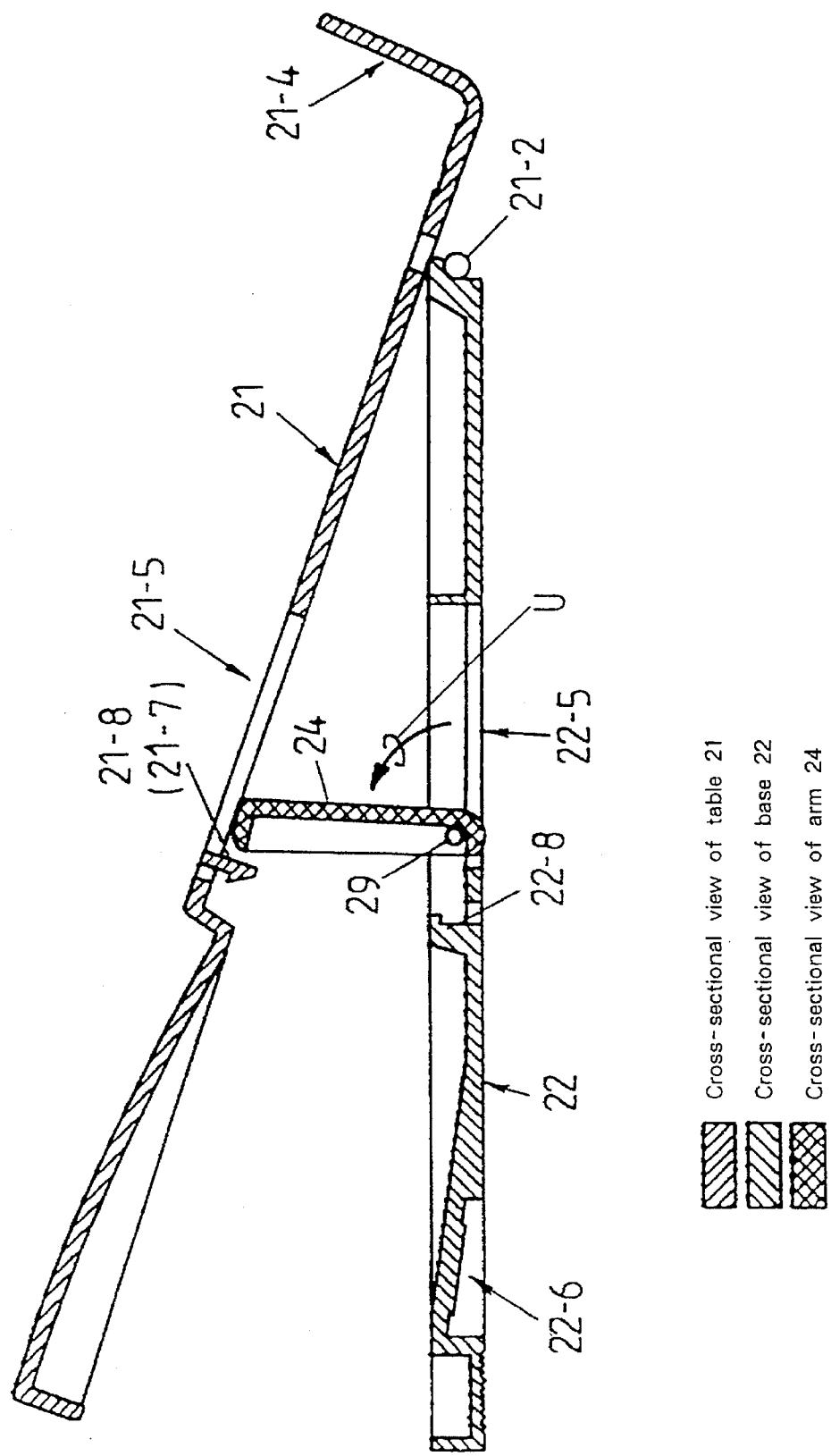

PORTABLE COMPUTER UTILIZABLE BY AN OVER HEAD PROJECTOR AND TILTING MECHANISM THEREOF

BACKGROUND OF THE INVENTION

The present invention relates to a portable information processing apparatus that has a main body, on the upper face of which is a keyboard, and a lid, which has provided on an internal surface a liquid crystal display panel and which is hinge coupled with the rear edge of the main body so as to be rotatable relative to the main body; and to a stand on which such a portable information processing apparatus is mounted. In particular, the present invention pertains to a portable information processing apparatus that, by using a liquid crystal display panel as a projection transparency, can be employed with an overhead projector (an OHP device); and to a stand for such a portable information processing apparatus. More specifically, the present invention relates to a portable information processing apparatus that can be employed with an OHP device while the main body and the lid remain coupled together, and to a stand for a portable information processing apparatus.

In line with current technical advances, increasing use is being made of compact personal computers (also called portable computers, or notebook computers) whose lightweight construction is indicative of the influence portability considerations had in their design.

A specific example of a notebook computer 1 is shown in FIG. 1. This example is almost identical to the ThinkPad 755CE/755CSE/755CD, which is a computer that is sold by IBM Japan, Ltd. In FIG. 1, the notebook computer 1, which is a so-called "structure with a lid," includes a thin main body 10 and a lid 50 that is so coupled with the main body 10 that it can be freely opened and closed.

The main body 10 has a shallow case 11 and a keyboard 12 that serves as an input device. A system board that is constituted by a CPU, a RAM, a ROM and a system bus, an external storage device, such as an HDD or a CD-ROM, and a battery pack (none of them shown) are incorporated in the case 11. The keyboard 12 serves as the upper face of the case 11 and also shields the inside.

The lid 50 includes a shallow rear cover 51, a liquid crystal display panel 52 that serves as a display device, and a front bezel 53 that secures the liquid crystal display panel 52. A pair of tongue pieces 54a and 54b, which have a nearly cylindrical shape, are integrally formed at the lower end of the front bezel 53. As the tongue pieces 54a and 54b are hinge coupled with corresponding portions of the main body 10, the lid 50 is hinged on the main body 10 so as to be rotatable relative to the main body 10. The liquid crystal display panel 52 is a thin display assembly wherein multiple liquid crystal devices are arranged. Since the liquid crystal display panel 52 does not itself emit light, a back light (not shown), which highlights display contents, and a light diffusion plate (not shown), which diffuses irradiated light and provides a uniform light intensity for the whole screen, are provided on the reverse face of the liquid crystal display panel 52. Drivers (not shown) along the X axis and the Y axis, which drive the liquid crystal display panel 52, are provided in the lid 50 that is shielded by the front bezel 53 and the rear cover 51.

As notebook computers are easily carried and are used in various places, and as the needs of users vary, various modes for the use of notebook computers are accordingly employed. The use of a notebook computer as an auxiliary presentation means is one of the most specific examples. In this case, members on the reverse side of the liquid crystal display panel (the rear cover and the light diffusion plate) are removed to permit the through transmission of light, and, in place of a projection transparency (foil), the liquid crystal display panel is so mounted on the light source portion of an overhead projector (OHP device) that an enlarged image of the display screen can be directly projected onto a screen. The advantages derived from such an application with an OHP device are as follows:

Advantage 1:

Since a display screen that is driven by the computer is used, a projection transparency is not required. In addition, as the contents of a display can be prepared and edited with a computer, during a presentation the display contents can be constantly updated (added to, deleted, or corrected) as needed. Further, since the display contents are ordinarily stored in advance in the memory of a computer or in an external storage device, such as an HDD or an FDD, and there is thus no increase in the amount of reference material that is needed for a presentation, even if the number of display screens is increased, it is easy to carry the reference material.

Advantage 2:

Since the screen data that are displayed on a liquid crystal display panel can be scrolled, or a new page can be displayed by key input (for example, with a cursor key), switching of the matter displayed on an OHP screen is facilitated. Further, since what is displayed can be controlled with a computer, the storing, transporting and arranging of the display contents are easy, and the order in which data are to be displayed will not be mixed up.

Advantage 3:

Some recent computers have included video capture controllers that can process analog video signals and a CD-ROM drive that can store video image data, and can thus display video images. It is therefore possible to project animated images onto an OHP screen by displaying a video image on the liquid crystal display panel.

Such use modes for notebook computers provide the following effects for a presenter. Specifically, the advanced graphic function of a computer can be fully employed, and presentation material can be prepared directly (the word "directly" here means that ordinary procedures, such as the printing of prepared data and the copying of data to a transparency, are not required). Again, as the material that is projected onto an OHP screen can be changed by the key operation, a presentation can be given smoothly. Since a presenter is not distracted by manually exchanging transparencies, he can concentrate all his attention on giving his presentation. Another plus factor is that the attention of the audience can be drawn to the OHP screen by displaying video images on it. And an associated benefit that is also appreciated by a presenter is that the preparation of transparencies, which requires much time, can be eliminated.

For the audience, the following effect can be provided. Since projected images can be switched instantaneously and smoothly, audience's concentration can be continuously ensured. The on and off display of video images on an OHP screen not only helps an audience to understand the contents of a presentation, but is also very visually attractive.

Therefore, it is not too much to say that the employment of notebook computers with OHP devices can provide improved and innovative styles and methods for conventional presentations, which are given at meetings of companies and other associations, and at academic meetings and other symposiums, and that are employed for lectures at universities and other schools.

To employ a notebook computer with an OHP device, it is necessary to solve several problems.

Problem 1:

One of the problems concerns the mounting of a liquid crystal display panel on an OHP light source, i.e., the installment. Disclosed in Japanese Unexamined Utility Model Publication No. Sho 64-121 is a lid, which includes a liquid crystal display panel, that can be removed from a main body at the hinge at its rear edge so that it is possible to mount only the lid on an OHP light source section. Disclosed in Japanese Unexamined Patent Publication No. Hei 03-1184 is a design that permits the removal of only a liquid crystal display panel, while the frame of a lid is retained in place, so that the panel can be mounted on an OHP light source section. Further, disclosed in Japanese Unexamined Patent Publication No. Hei 03-282441 is a design that instead of permitting the removal of a liquid crystal display panel from a main body, provides for the mounting on an OHP light source section of an expansion liquid crystal display panel.

When, according to Japanese Unexamined Utility Model Publication No. Sho 64-121 and Japanese Unexamined Patent publication No. Hei 03-1184 and No. Hei 03-282441, only a flat liquid crystal display panel is mounted on an OHP light source section, as the center of gravity is comparatively stable, there is no fear of the panel falling and the problem concerning installation can be ignored.

However, when, according to the descriptions given in these publication documents, liquid crystal display panels are provided that can be separated from computer bodies, since the cables that carry the RGB signals that are required for comparatively high speed performance must be extended from the main body to the liquid crystal display panel, the influence of electromagnetic interference (EMI) can not be avoided. In addition, in the notebook computer that is disclosed in Japanese Unexamined Utility Model Publication No. Sho 64-121, the hinge portion must not only support the main body and the cover, but must also permit it to be detachable and must further support a mechanism that passes through the cables. Thus, it can be assumed that an actual structure will be complicated. With the design that is disclosed in Japanese Unexamined Patent Publication No. Hei 03-1184, after a liquid crystal display panel is removed, it does not seem that the connection of a cable and a connector will be as easy as is shown in the diagrams. And with the design that is described in Japanese Unexamined Patent Publication No. Hei 03-282441, a user would be charged more for the expansion liquid crystal display panel. In short, systems that only liquid crystal display panels to be is mounted on OHP light source sections can not be realized as easily as would be anticipated from the drawings included in the individual publication documents. In FIG. 4 of German Unexamined Patent Publication No. 4019755, 1992 is disclosed a main body and a liquid crystal display panel that are not separated from each other, and that, with a lid opened until it is almost horizontal, are both mounted on an OHP light source section. The problems that arise from the removal of a liquid crystal display panel and the extension of RGB signal lines can thereby be eliminated. Many OHP devices that are currently available on the market, however, do not have a large enough foot print to permit the mounting on them of both a liquid crystal display panel and a keyboard (main body). To implement this patent publication, not only the notebook computer but also a specially ordered OHP device must be prepared, making this system unsuitable general application. Also in Japanese Unexamined Patent Publication No. Hei 04-16824 is disclosed a design whereby the entire main body of a computer is mounted on an OHP light source section. More specifically, while a lid (a liquid crystal display panel) is open and is perpendicular to the main body, a recessed portion, which is integrally formed with the main body, engages one end of an OHP light source section and is installed. The OHP device disclosed in this publication is employed with a specific computer, and is, as it were, a specially ordered device. The main body (keyboard) of a computer that stands upright would interrupt the view of the audience, so that they could scarcely see an OHP screen.

It is not realistic for computer makers to develop optical devices that can be used only with the products of a specific company, as in German Patent Publication No. 4019755, 1992, and Japanese Unexamined Patent Publication No. Hei 04-16824. It is preferable that OHP devices that are available on the market be employed for such applications.

Problem 2:

Another problem is the positioning of a liquid crystal display panel relative to an OHP light source section in the direction of height.

To use a computer with an OHP device, a liquid crystal display panel is set parallel to the glass surface of the OHP light source section. A liquid crystal display panel that is used for a notebook computer has, at most, a diagonal dimension of about 10.4 inches, whereas the glass surface of a general OHP light source section, at 11×11 inches, is a size larger. Thus, when the liquid crystal display panel is positioned a small distance above the OHP light source section, more light is gathered on the display panel and a brighter image can be projected onto a screen.

When the main body and the lid are positioned with the lid open and almost horizontal to the main body, as in German Patent Publication No. 4019755, this positioning is preferable because the liquid crystal display panel is separated from the OHP light source section only by a distance that is equivalent to the thickness of the main body. However, with a computer model that has a thick main body, the liquid crystal display panel will be positioned too high and outside the focusing range of an OHP light source section, and an image that is projected onto a screen will be blurred. Since it incorporates a CD-ROM drive, the ThinkPad 755CD that is sold by IBM Japan Ltd., for example, which has a thick main body of about 3.7 mm, is outside the a focusing range of an OHP device.

The height of a liquid crystal display panel relative to an OHP light source section is determined by obtaining a balance between the light collection and the focusing range. Through experience, it has been determined that 2 to 3.5 cm is an appropriate height for a liquid crystal display panel that is to be used with many current OHP devices.

Problem 3:

In those cases where liquid crystal display panels are not detachable and entire bodies are mounted on OHP light source sections, problems arise concerning the effect of radiation heat on the main body and on key input operations.

When the liquid crystal display panel is not detachable from the main body and the entire body is mounted on the OHP light source section, the body is directly exposed to radiation heat from the light source. If an OHP device has a comparatively low power of about 600 W, natural heat release will solve this matter. However, when a computer is mounted on an OHP device that has high power of about 1000 W and high light intensity, it is expected that the computer body will be subjected to temperatures that are much higher than those that are encountered during normal use. As a result, circuits (especially those for a CPU that itself easily generates heat) on a system board that is provided inside the main body may run away.

When a main body is set perpendicular to an OHP light source section and is installed as is disclosed in Japanese Unexamined Patent Publication No. Hei 04-16824, the problem due to the radiation of heat can be solved. It is, however, difficult for a presenter to input data during a presentation by using the keys of a keyboard which is set upright. Further, as is mentioned previously, the main body interfere the view of an audience.

When only a liquid crystal display panel is mounted on an OHP light source section, as in Japanese Unexamined Utility Model Publication No. Sho 64-121 and Japanese Patent Publication No. Hei 03-1184 and No. Hei 03-282441, the main body can be positioned at an arbitrary location so that it is not exposed to radiation heat, and the problem concerning key input does not arise. However, such solution cause other problems as already described.

There is also a proposal that calls for the attaching of a cooling fan to a notebook computer. The addition of devices and other items, however, heads to an increase in the size of a computer and reduces any cost advantage.

Problem 4:

When members on the reverse of a lid are removed, an electrically active portion, such as a backlight, is exposed externally, and a user may touch it accidentally. Further, when a liquid crystal display panel is employed with an OHP device, it is not necessary for the backlight to keep lighting place, and, further, the electricity consumed by it merely causes a waste of power. None of the publications described above, however, points out this problem.

SUMMARY OF THE INVENTION

It is one object of the present invention to provide an improved portable information processing apparatus that can be employed with an overhead projector (OHP device) by using a liquid crystal display panel as a projection transparency, and to provide a stand with which the installation of such a portable information processing apparatus can be effected.

It is another object of the present invention to provide a portable information processing apparatus that can be employed with an OHP device while its main body and its lid are linked together, and to provide a stand for such a portable information processing apparatus.

It is an additional object of the present invention to provide a portable information processing apparatus that can be employed with an OHP device without the necessity of providing additional devices and items, and to provide a stand for such a portable information processing apparatus.

It is a further object of the present invention to provide a portable information processing apparatus that can be employed with an OHP device while a main body and a lid are linked together and that has high useability, durability and safety, and to provide a stand for such a portable information processing apparatus.

It is still another object of the present invention to provide a portable information processing apparatus that can be employed with OHP devices that are available on the market and for which installation relative to radiation heat is excellent, and to provide a stand for such a portable information processing apparatus.

It is a still further object of the present invention to provide a portable information processing apparatus that can be employed with OHP devices that are available on the market and to which data can be inputted via keyboard while the apparatus is installed on an OHP light source section, and to provide a stand for such a portable information processing apparatus.

SUMMARY OF THE PRESENT INVENTION

To achieve the above objects, according to a first aspect of the present invention, a portable information processing apparatus comprises: a main body that has a keyboard on a upper face; a lid in which a liquid crystal display panel is mounted on an internal surface and that is so hinged at a rear edge of the main body as to be rotatable relative to the main body; and a tilting mechanism for raising a front edge of the body so as to position the front edge higher than the rear edge.

According to a second aspect of the present invention, a stand for a portable information processing apparatus, where a lid is so hinged at a rear edge of the main body as to be rotatable relative to the main body, supports the main body in a reclining position with the rear edge depressed.

The tilting mechanism according to the first aspect may either be detachable from the main body or may be formed together with the main body so long as the mechanism can support the main body in a reclining position with the rear edge depressed.

It is desirable that the tilting mechanism position the main body so that it is tilted at an acute angle relative to a horizontal face. If the main body is not tilted and is closely mounted on an OHP light source section, it will be directly exposed to radiated heat. If, on the contrary, the main body is so tilted that the front edge is too high, it will interfere with the field of vision of an audience that is looking at an OHP screen.

A tilting mechanism that is detachable from a main body is a structure wherein a base which can be installed on an OHP device and a table on which the main body is mounted are so positioned that they may be rotated around a shaft. When the tilting mechanism is not in use, the table and the base are folded together to reduce the size of the mechanism, so that it can be easily carried and stored.

When the tilting mechanism is fastened to an OHP device with a strap, safety during use is increased. Since the strap is made of soft material and its length can be easily adjusted, it can be adapted to OHP devices that have different shapes and sizes.

Other objects, features, and advantages of the present invention will become apparent by referring to the accompanying drawings during the detailed description of the embodiments of the present invention that is presented later.

BRIEF DESCRIPTION OF THE DRAWINGS

FIG. 18 is a cross-sectional view, taken along the line D—D, of the stand 20 shown in FIG. 11A (i.e., in the open state).

FIG. 24 is a diagram illustrating a cap 23a that can be coupled with the locking mechanism 41a.

DESCRIPTION OF THE PREFERRED EMBODIMENTS

The embodiments of the present invention will be described by the following articles for convenience sake:
A. Outline Arrangement of a Notebook Computer
B. Arrangement of a Lid
C. Installation to an OHP Device
D. Presentation Employing a Notebook Computer
E. Appendix A. Outline Arrangement of a Notebook Computer The outline arrangement of a notebook computer 1 that is employed for the embodiments will be described in this article.

Figure 1:
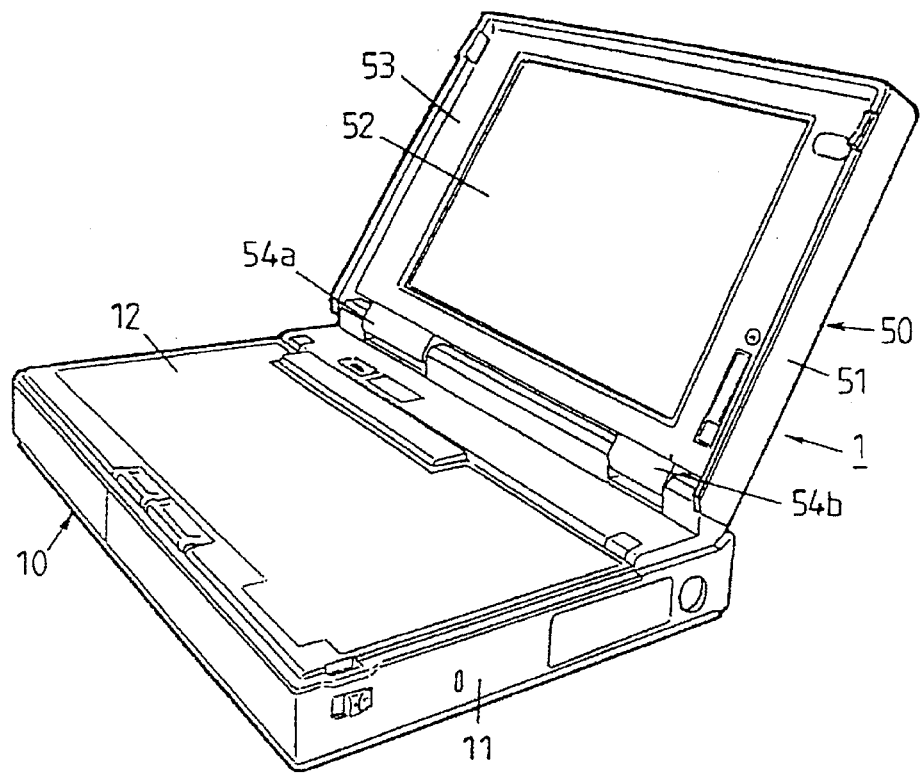
FIG. 1 is a perspective view of the outline of a general notebook computer.
Figure 2:
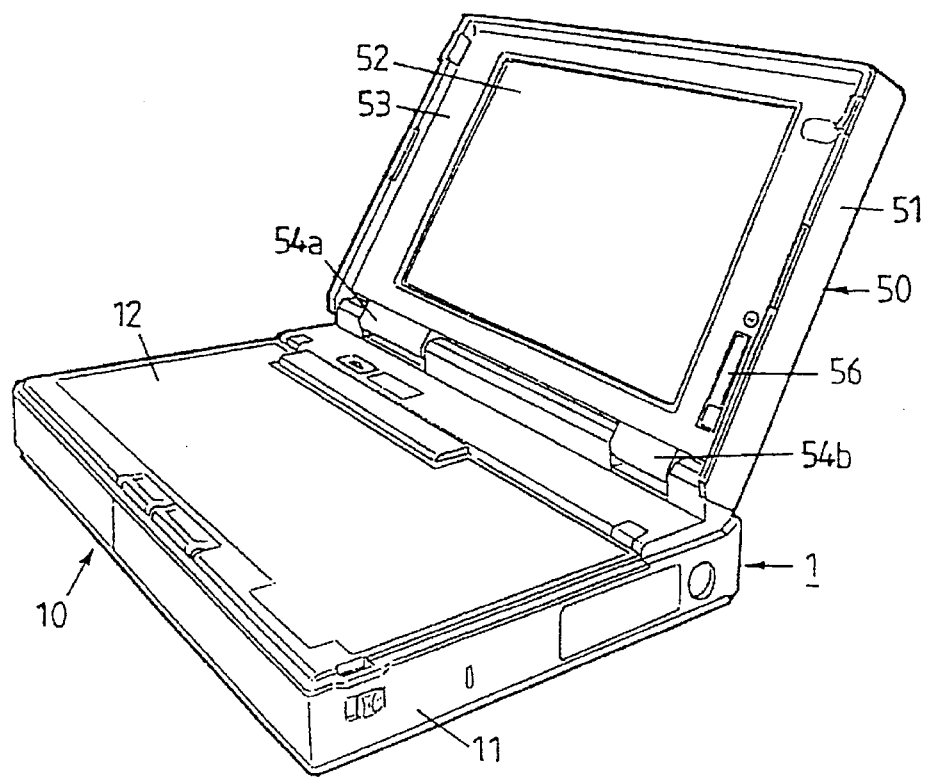
FIG. 2 is a perspective view of the outline of a notebook computer that is employed to carry out the present invention.

FIG. 2 is a perspective view (assembly view) of the outline of the notebook computer 1. FIG. 2 is almost the same as FIG. 1, which is referred to in the description of the background, except for a detailed portion that will be described later. This means that for the notebook computer 1 that realizes the present invention, most of components can be used in common with a conventional notebook computer. It would be understood for one having ordinary skill in art that to use components in common provides a cost advantage for makers in both the development and the manufacturing stages.

A main body 10 includes a shallow case 11 and a keyboard 12 that serves as an input device. In the case 11 are incorporated a system board that includes a CPU, a RAM, a ROM and a system bus, an external storage device, such as an HDD or a CD-ROM, and a battery pack (none of them shown). The keyboard 12 also forms the upper face of the case 11 and shields the interior.

A lid 50 includes a shallow rear cover 51, a liquid crystal display panel 52 that serves as a display device, and a front bezel 53 that supports the liquid crystal display panel 52. A pair of almost cylindrically shaped tongue pieces 54a and 54b are integrally formed at the bottom of the front bezel 53. The lid 50 is supported rotatably at the main body 10 by coupling the tongue pieces 54a and 54b to the corresponding portions of the main body 10 to form a hinge.

The liquid crystal display panel 52 is a thin display device wherein multiple liquid crystal elements are arranged. In this embodiment, a transparent TFT (Thin Film Transistor) liquid crystal display panel that provides an excellent contrast and gray scales is employed. Since the liquid crystal display panel 52 itself does not emit light, a backlight (which will be described later), which highlights the display contents, and a light diffusion plate (which will be described later), which diffuses the light irradiated by the backlight to provide a uniform intensity for the whole panel 52, are provided on the reverse of the liquid crystal display panel 52. Drivers for the X axis and the Y axis (not shown) that drive the liquid crystal display panel 52 are also included inside the lid 50 that is covered by the front bezel 53 and the rear cover 51. A slide knob 56 is provided at the lower right of the front bezel 53 to adjust the luminance/contrast of the liquid crystal display panel 52.

The details of the lid 50 and the main body 10 will be explained in articles B and C.

B. Arrangement of a Lid

The arrangement of the lid 50 of the notebook computer 1 will now be described in detail.

Figure 3:
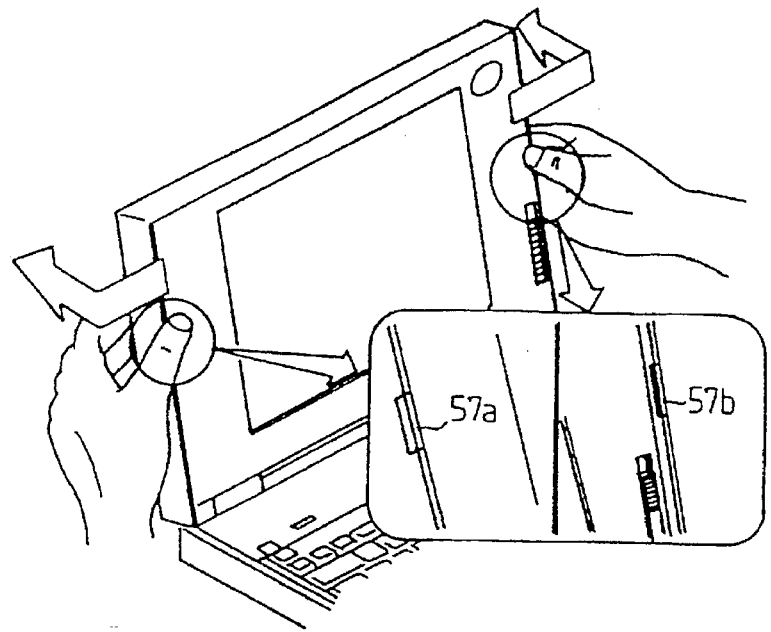
FIGS. 3A and 3B are diagrams showing the manipulation required by a user to remove a rear cover 51 from a front bezel 53.
Figure 3:
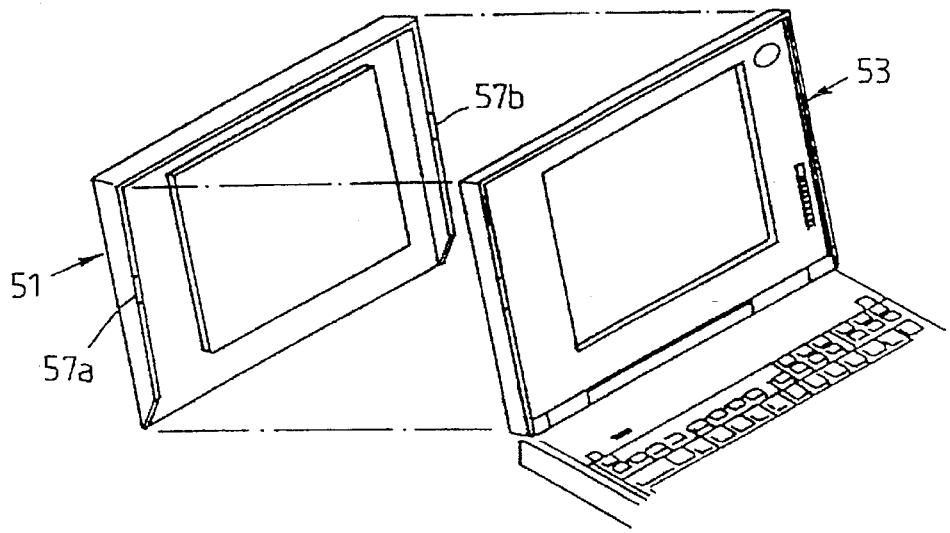

In FIG. 3 are illustrated the manipulative procedures that are required for a user to remove the rear cover 51 from the front bezel 53.

As is shown in FIG. 3A, a user first places his thumbs on latches 57a and 57b, which are provided on the side edges of the rear cover 51. Then, the user applies sufficient pressure with this thumbs to force the latches 57a and 57b outward and to disengage them, and with additional pressure, forces the rear cover 51 back until it is separated from the front bezel 53. Since the rear cover 51 is integrally formed with the light diffusion plate 55 and there is nothing to cover the reverse after the rear cover 51 has been removed, the liquid crystal display panel 52 is transparent, as is shown in FIG. 3B.

Figure 4:
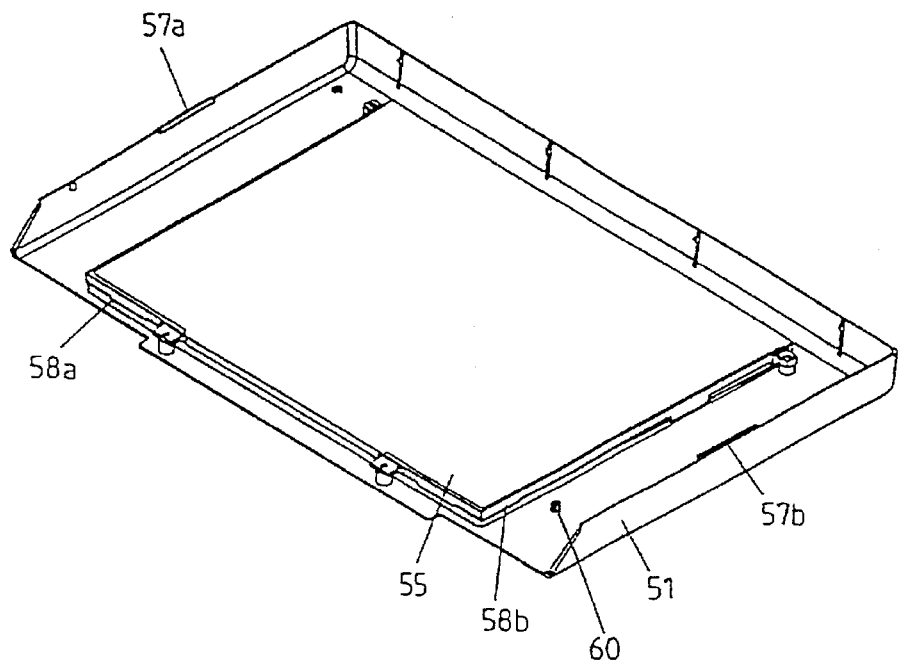
FIG. 4 is a perspective diagram of the rear cover 51 of a lid 50.

FIG. 4 is a perspective view of the rear cover 51 of the removed lid 50.

The rear cover 51 is shaped like a shallow box with an open top. The latches 57a and 57b are integrally and symmetrically formed at the top ends of the side walls of the rear cover 51. The light diffusion plate 55 is attached to the bottom of the rear cover 51 by brackets 58a and 58b. The light diffusion plate 55 is a member that uniformly diffuses the light irradiated by a backlight 59 onto a screen of the liquid crystal display panel 52, and is formed by laminating acrylic plates that guide irradiated light and multiple sheets that have minute slits on the surface to diffuse light in every direction. A protrusion 60 is formed on the lower right of the bottom of the rear cover 51. The protrusion 60 is provided for the detection of the attachment and the removal of the rear cover 51; its mechanism and how it functions will be described in detail later.

Figure 5:
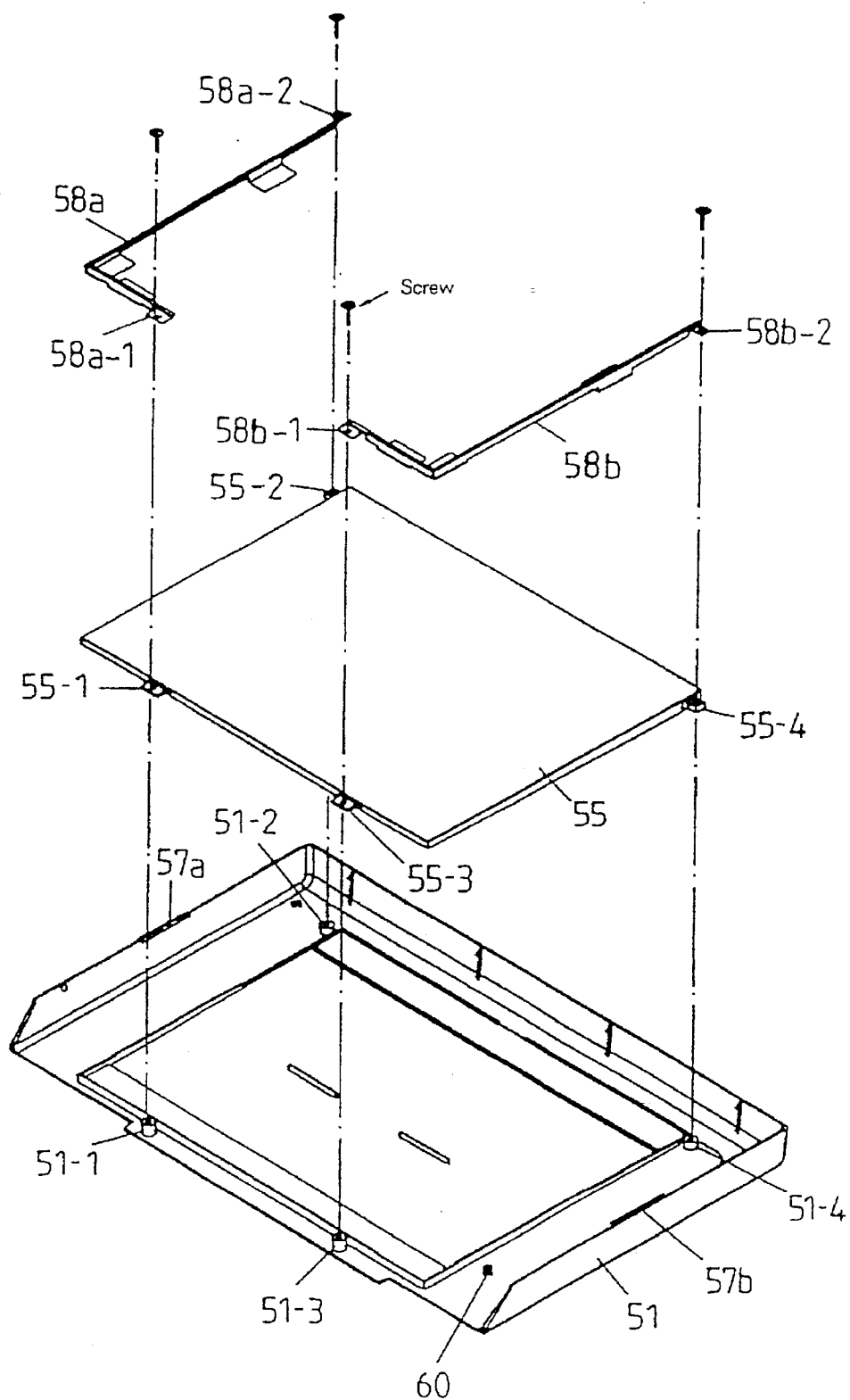
FIG. 5 is an exploded diagram showing the rear cover 51.

FIG. 5 is an exploded diagram of the rear cover 51.

The bracket 58a has a tab 58a-1 at one end and a tab 58a-2 at the other, while the bracket 58b has a tab 58b-1 at one end and a tab 58b-2 at the other. Tabs 55-1, 55-2, 55-3, and 55-4 are attached to the side edges of the light diffusion plate 55, and four screw holes 51-1, 51-2, 51-3, 51-4 are formed in projections on the bottom face of the rear cover 51. The positions of the holes in the tabs 58a- . . . and 55-1 . . . correspond to those of the screw holes 51-1 . . . on the bottom of the rear cover 51. The light diffusion plate 55 is secured by screws to the bottom of the rear cover 51 while the positions of the individual layers of the plate 55 are adjusted by the brackets 58a and 58b.

As is shown in FIGS. 4 and 5, the rear cover 51 includes only the light diffusion plate 55 and the members that are employed to attach the light diffusion plate 55, and does not include any electric components, such as a backlight and drivers. In other words, the rear cover 51 that is removable is constructed only of inexpensive components that are made of comparatively soft material. Therefore, if the rear cover 51 is dropped accidentally while it is removed, it will not be damaged and its durability is ensured. If the rear cover 51 should be broken, no replacement of electric components is required and thus the costs of repairs or the compensation expenses are low. Further, since a signal line for driving the liquid crystal display panel 52, etc., does not have to be extended when the rear cover 51 is removed, the design and the handling is easy.

Figure 6:
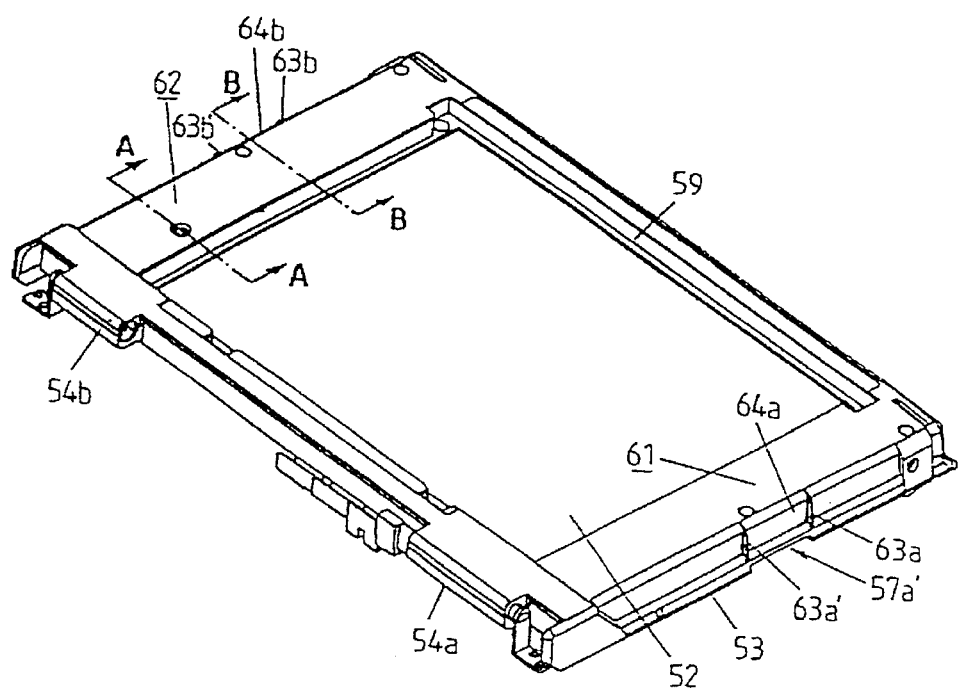
FIG. 6 is a rear perspective view of the front bezel 53 of the lid 50.

FIG. 6 is a rear perspective view of the front bezel 53 of the lid 50 with the rear cover 51 removed.

The front bezel 53 and a back member 61 are integrally formed (i.e., inseparable). A rectangular opening that measures 10.4 inches diagonally is located almost in the center of the front bezel 53 and the back member 61 in order to expose a display portion of the liquid crystal display panel 52 that is sandwiched between the front bezel 53 and the back member 61. Further, the paired tongue pieces 54a and 54b, which are cylindrically shaped, are formed at the lower ends of the front bezel 53 and the back member 61, so that they are coupled on hinges with the main body 10.

At a position near the lower left of the back member 61 is a hole 62 into which the protrusion 60 is inserted when the rear cover 51 is attached. An attachment detection mechanism 70 that is mounted inside the hole 62 detects the attachment of the rear cover 51 when the protrusion 60 is inserted into the hole 62 (a procedure that will be described later).

Pairs of ribs 63a and 63a', and 63b and 63b' are provided on the respective sides of the back member 61. When the rear cover 51 is to be attached to, or removed from, the front bezel 53, the ribs 63a and 63a' restrict the movement of the latch 57a and permit it to be shifted only forward and backward. The ribs 63b and 63b' likewise restrict the movement of the latch 57b. Guide faces 64a and 64b, whose end limits are delimited by the pairs of the ribs 63a and 63a' and 63b and 63b' respectively, are slightly tapered. Notches 57a' and 57b', which engage the respective latches 57a and 57b, are formed in the side edges of the front bezel 53. And the external surface of the back member 61 is almost the same size as the internal surface of the rear cover 51. Therefore, when the rear cover 51 is pushed from the back with the latches 57a and 57b being held in alignment of the ribs 63a and 63b, the latches 57a and 57b are guided by the ribs 63a and 63b while sliding across the guide faces 64a and 64b until they finally engage the notches 57a' and 57b'. The attachment of the rear cover 51 is therefore an easy procedure for a user to perform. Further, as is shown in FIG. 3A, after the latches 57a and 57b are forced outward to disengage them from the notches 57a' and 57b', the elastic recovery response forces the latches 57a and 57b inward so that they slide across the guide faces 64a and 64b in the direction of the taper (i.e., the direction of removal). Therefore, a user can remove the rear cover 51 by a simple procedure and usability is ensured.

Figure 7:
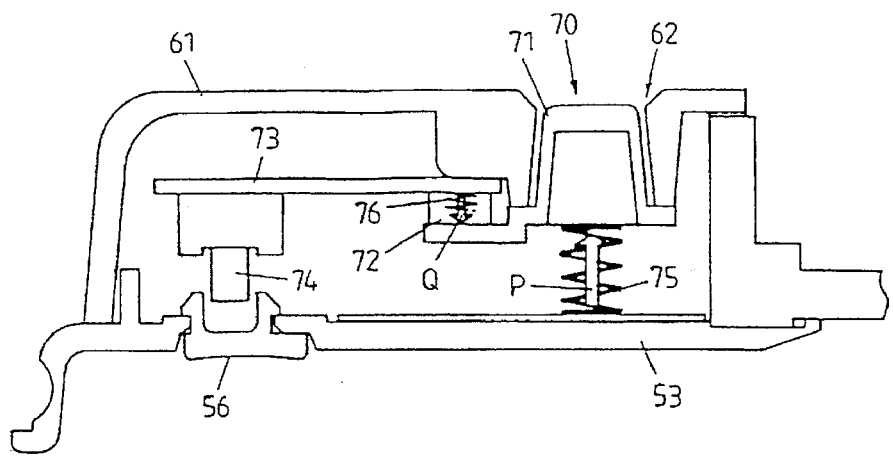
FIGS. 7A and 7B are cross-sectional views taken along the line A—A in FIG. 6, with FIG. 7A specifically showing the condition when a projection 60 is not inserted (i.e., when the rear cover 51 is removed), and with FIG. 7B specifically showing the condition when the projection 60 is inserted (i.e., when the rear cover 51 is attached).
Figure 7:
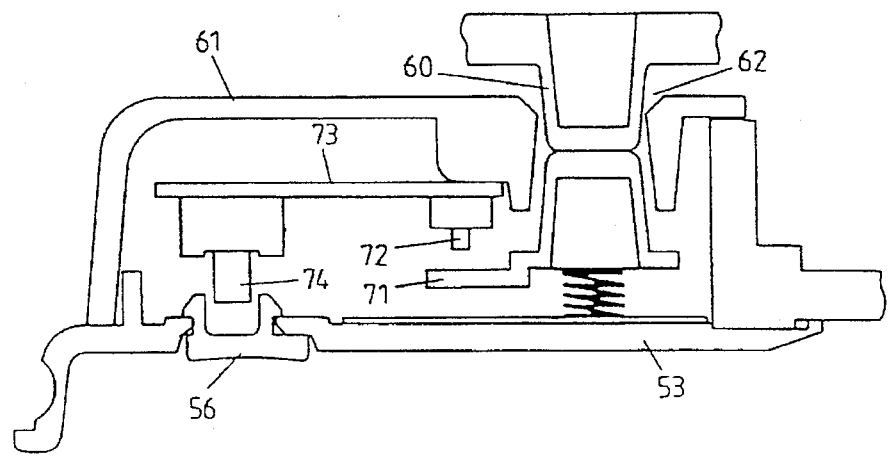

FIG. 7 is a cross-sectional view taken along the line A—A in FIG. 6. More specifically, in FIG. 7A is shown the state where the protrusion 60 is not inserted into the hole 62 (i.e., the rear cover 51 is removed), and in FIG. 7B is shown the state where the protrusion 60 is inserted into the hole 62 (i.e., the rear cover 51 is attached). The line A—A bisects the hole 62. The structure of the attachment detection mechanism 70 can be clearly understood from the following explanation that is given while referring to FIG. 7.

An actuator 71 is mounted in the hole 62. The actuator 71 has an extended convex portion that is almost at its center and a flat portion around its circumference. The convex portion is constantly urged forward by a spring 75 in a direction that is indicated by the arrow P. A part of the flat portion of the actuator 71 abuts upon the distal end of a switch 72. An inverter circuit board 73 is included in an internal space that is defined by the front bezel 53 and the back member 61. The inverter circuit board 73 is a printed wiring board on which is mounted circuits (not shown) that control the luminance/contrast of the liquid crystal display panel 52. In addition, the switch 72 for controlling the power to the backlight 59 and a volume switch 74 for adjusting a luminance/contrast set value are also mounted on the inverter circuit board 73. The switch 72 is constantly urged forward by an internally provided spring 76 in a direction that is indicated by the arrow Q. When the switch 72 protrudes in the direction Q, the switch 72 is rendered on and power is supplied to the backlight 59. When the switch 72 is forced down in the opposite direction, it is rendered off and the supply of power to the backlight 59 is halted. The volume switch 74 interlocks with the slide knob 56 that is provided on the surface of the front bezel 53. The recovery force P of the spring 75 is so set that it is greater than the recovery force Q of the spring 76.

When the rear cover 51 is removed and the protrusion 60 is removed from the hole 62, the area above the convex portion of the actuator 71 is open, as is shown in FIG. 7A. As a result, the actuator 71 is urged forward by the spring 75 in the direction that is indicated by the arrow P, and the flat portion renders the switch 72 off against the recovery force Q of the spring 76. That is, when the rear cover 51 is removed to prepare the notebook computer 1 for use with an OHP device, the backlight 59 is automatically turned off.

When the rear cover 51 is attached, the protrusion 60 is inserted into the hole 62 and pushes the actuator 71 in the direction that is opposite to that which is indicated by the arrow P, as is shown in FIG. 7B. Accordingly, the switch 72 is released by the flat portion of the actuator 71 and is urged forward by the spring 76 in the direction indicated by the arrow Q to be ON. That is, when the rear cover 51 is attached so that the apparatus can be used as a common notebook computer, the backlight 59 is automatically turned on.

Since the function that automatically turns on and off the backlight 59 eliminates the chance of a user accidentally touching the externally exposed backlight 59 when it is turned on, operational safety is ensured for the user. Further, since a user does not make a conscious effort to turn the backlight 59 on and off when detaching and attaching the rear cover 51, ease of use is increased. In addition, as the backlight 59 is not unnecessarily turned on, the power consumption can be saved.

Figure 8:
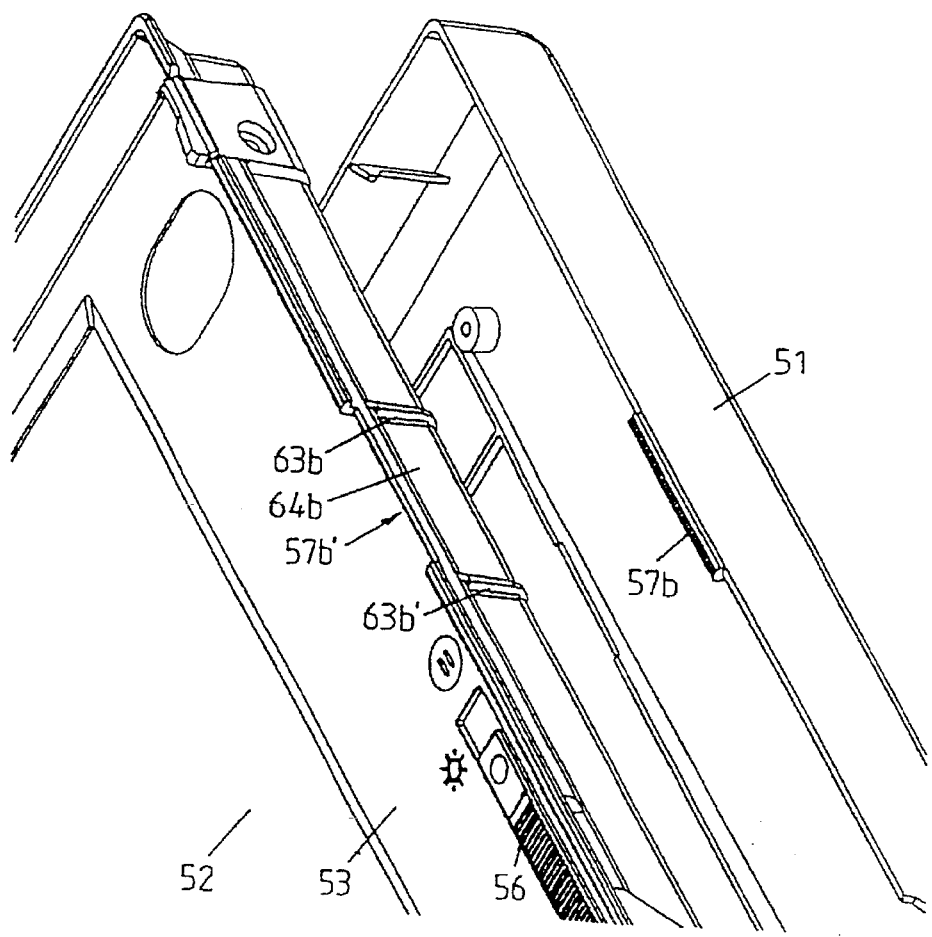
FIG. 8 is a diagram, as viewed from the front of the lid 50, of the state that exists when a latch 57b on the right side of the rear cover 51 is released from a notch 57b' of the front bezel 53.
Figure 9:
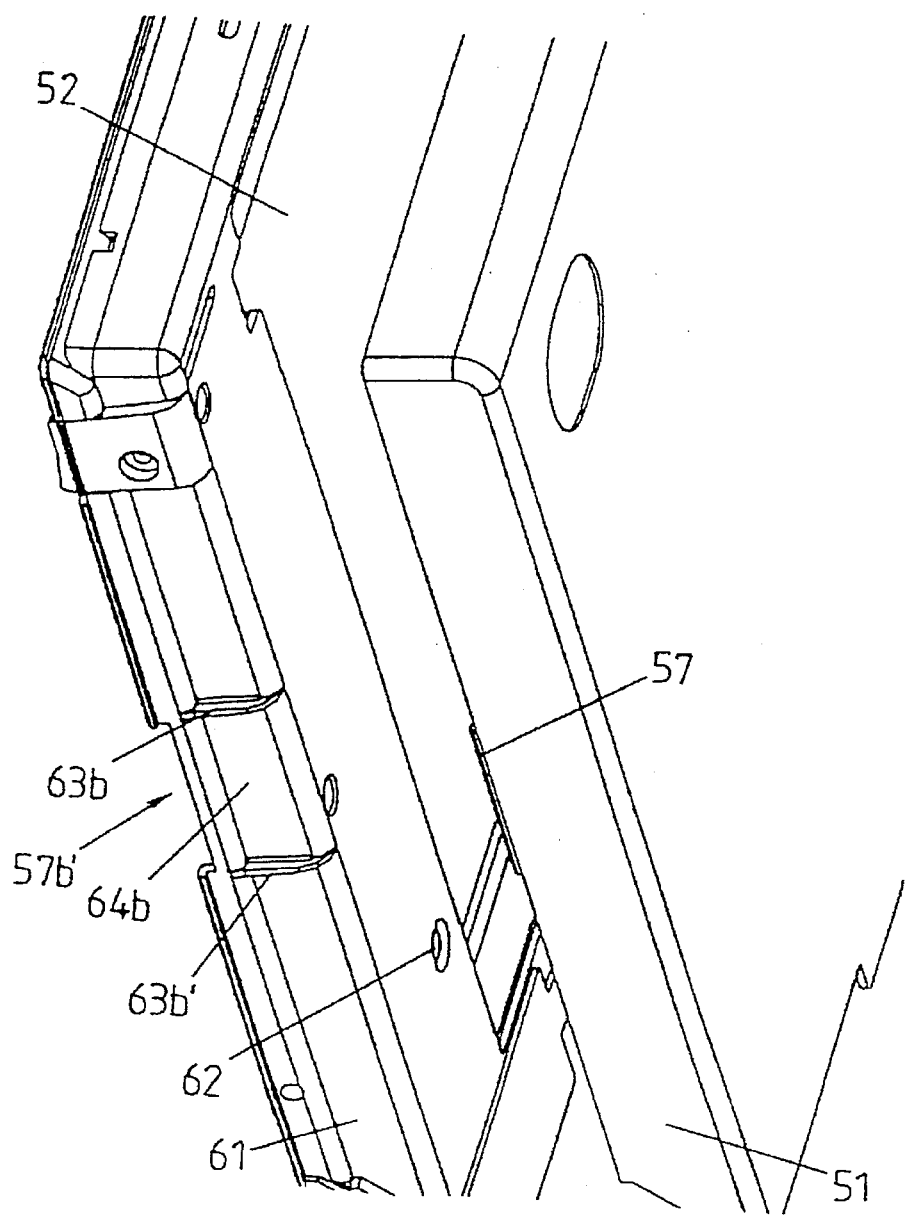
FIG. 9 is a diagram, as viewed from the rear of the lid 50, of the state that exists when the latch 57b on the right side of the rear cover 51 is removed from the notch 57b' of the front bezel 53.

FIGS. 8 and 9 are diagrams of the lid 50 when it is viewed from the front and from the rear, showing the state where the latch 57b on the right edge of the rear cover 51 is disengaged from the notch 57b' of the front bezel 53.

As is previously described, the paired ribs 63b and 63b' are provided on the left side face of the back member 61. When the rear cover 51 is to be attached to, or removed from, the front bezel 53, the ribs 63b and 63b' restrict the movement of the latch 57b and permit it to be shifted only forward and backward. The guide face 64b, whose end limits are delimited by the ribs 63b and 63b', is tapered slightly so that the latch 57b can be moved smoothly. Further, the notch 57b' that engages the latch 57b is formed on the left end of the front bezel 53, and a plurality of grooves are formed in the surface of the latch 57b so that a user can securely engage it with his finger. It should be understood that the latch 57b, the notch 57b', the ribs 63b and 63b', and the guide face 64b are so formed as to be symmetric with the latch 57a, the notch 57a', the ribs 63a and 63a', and the guide face 64a.

When the rear cover 51 is pushed from the back, with the latch 57b being held in alignment by the ribs 63b and 63b', the latch 57b slides across the guide face 64b while being guided by the rib 63b until it finally engages the notch 57b'. As is shown in FIG. 3A, when the latch 57b is disengaged from the notch 57b' by applying sufficient force to extend the latch 57b outward, the latch 57b is forced inward by the elastic recovery and slides across the guide face 64b in a direction of the taper (i.e., the removal direction). A user, therefore, can remove the rear cover 51 by a simple procedure, and useability is ensured.

Since the illustrations in FIGS. 8 and 9 of the essential portions, such as the latch 57b and the notch 57b', that are employed for the attachment and the removal of the rear cover 51 are drawn larger than those in FIGS. 4 and 6, the structure and the functions of the individual components can be more clearly understood.

Figure 10:
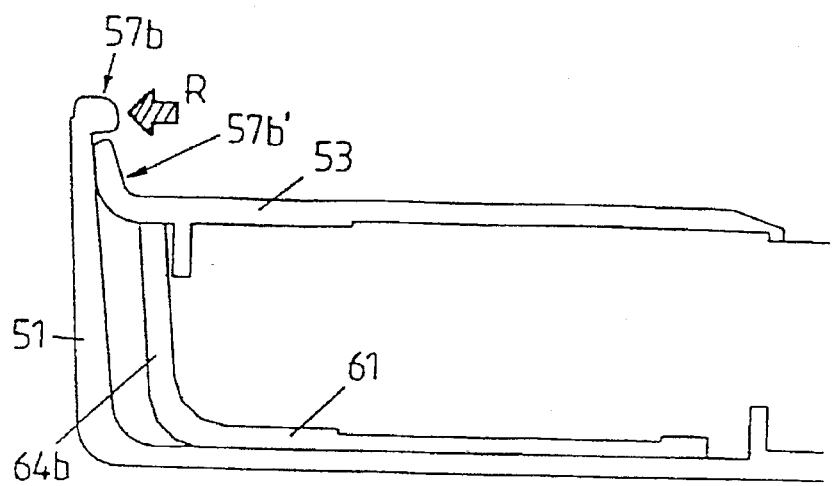
FIGS. 10A and 10B are cross-sectional views of the front bezel 53 taken along the line B—B in FIG. 6, with FIG. 10A specifically showing the condition when the rear cover 51 is attached, and with FIG. 10B specifically showing the condition when the rear cover 51 is removed.
Figure 10:
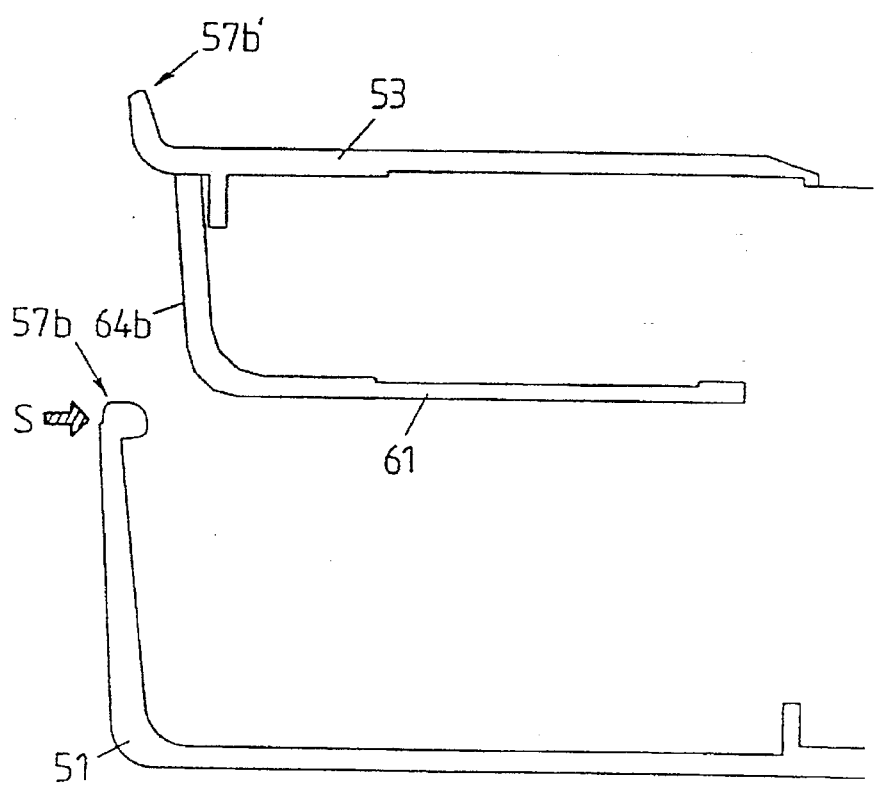

FIG. 10 is a cross-sectional view taken along the line B—B in FIG. 6. More specifically, FIG. 10A is a cross-sectional view taken along the line B—B showing the state where the rear cover 51 is attached, and FIG. 10B is a cross-sectional view taken along the line B—B showing the state where the rear cover 51 has been removed. Since the line B—B bisects the latch 57b and the notch 57b', it can be clearly understood when referring to FIG. 10 whether the latch 57b is engaged with or disengaged from the notch 57b'.

As is shown in FIG. 10A, by engaging the notch 57b' with the latch 57b, the rear cover 51 is held in place at the front bezel 53. When the side wall of the rear cover 51 is pressed outward by force R, the latch 57b is displaced outward and can be disengaged from the notch 57b'. Once the latch 57b is disengaged, recovery force S, which acts in the opposite direction to that of the force R, is applied to the latch 57b, as is shown in FIG. 10B. As a consequence, the distal end of the latch 57b is pressed against the tapered guide face 64b, and slides down in the direction of the taper. On the other hand, when the rear cover 51 is being attached, the latch 57b is slid along the guide face 64b against the resistance of the recovery force S. Then, when a comparatively large resistance force R is acting on the latch 57b just before it reaches the notch 57b', the latch 57b engages the notch 57b'. It would be understood for one having ordinary skill in the art that the attachment and the removal of the rear cover 51 can be performed by a simple procedure.

In FIG. 10A, the latches 57a and 57b are positioned inside the lid 50 (i.e., on the face that includes the liquid crystal display panel 52). It would be understood that, when the lid 50 is closed against the main body 10, the latches 57a and 57b are hidden inside and the force R that is required to disengage them cannot be applied. With such a structure, since the removal of the rear cover 51 is inhibited when the lid 50 is closed, while a person is carrying the notebook computer 1, there is no possibility of the person's fingers pressing and accidentally disengaging the latches 57a and 57b and causing the lid 50 to fall off. In short, handling safety is ensured.

From the explanation that is given while referring to FIGS. 3 through 10, it would be understood by one having ordinary skill in the art that the notebook computer 1 according to the embodiment has little need for additional devices and components in order for it to be employed with an OHP device.

C. Installation to an OHP Device

In this article, one example of a mechanism for installing the notebook computer 1 on a light source section of an OHP device will be explained.

C-1. Installation Example 1

The first installation example is a stand 20 on which the notebook computer 1 is mounted and is securely attached to an OHP device. The illustrations in FIGS. 11A through 11D are the front face, the back face and the reverse of the stand 20, and the closed state of the stand 20. The illustrations in FIGS. 12A and 12B depict the placement of the notebook computer 1 on a table 21 of the stand 20 that is attached to the OHP device.

Figure 11:
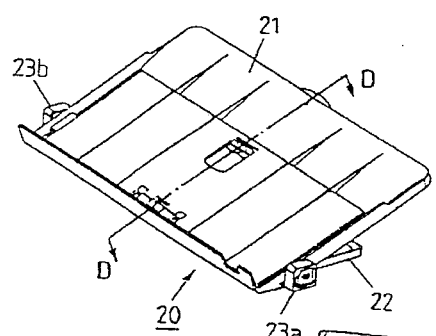
FIGS. 11A through 11D are diagrams showing a stand 20 with which a notebook computer 1 is mounted, with FIG. 11A being a front perspective view of the stand 20, with FIG. 11B being a rear perspective view of the stand 20, with FIG. 11C being a perspective view of the reverse of the stand 20, and with FIG. 11D being a top perspective view of the stand 20 when it is closed.
Figure 11:
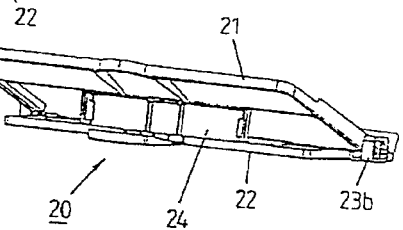
Figure 11:
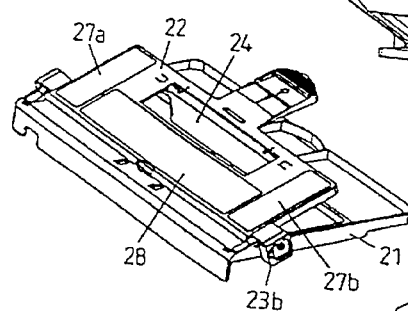
Figure 11:
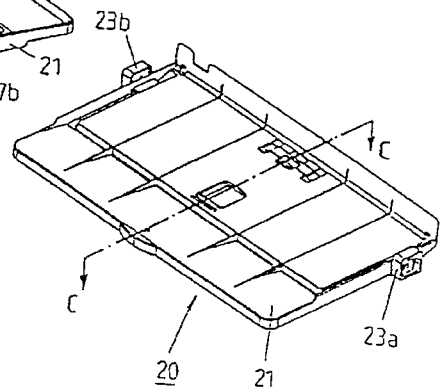
Figure 12:
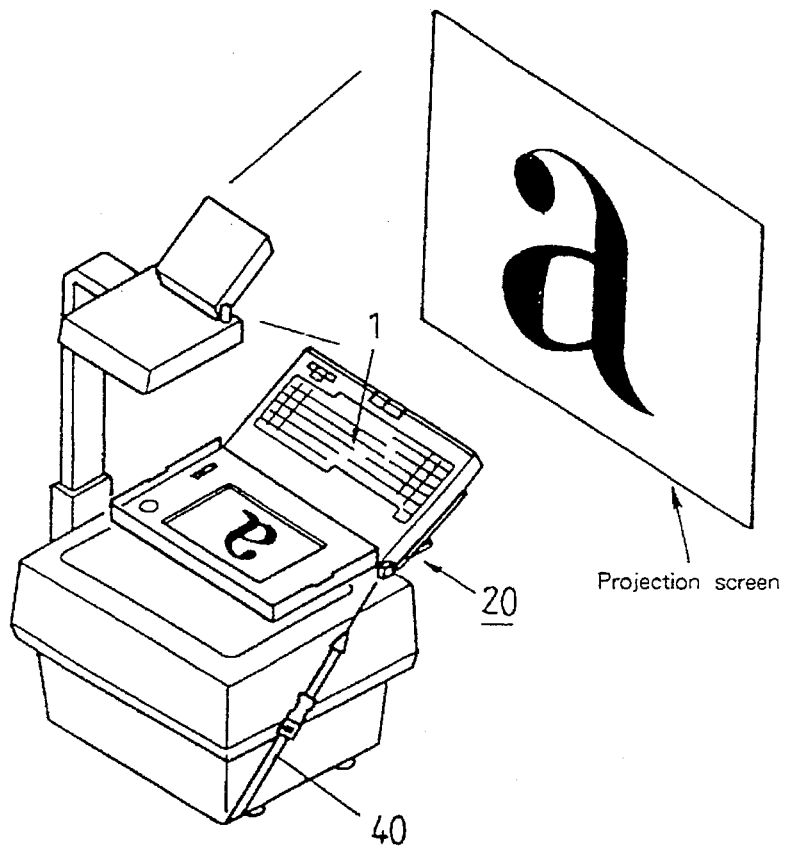
FIGS. 12A and 12B are perspective views of the notebook computer 1 when it is installed on an OHP light source section by using the stand 20, with FIG. 12A specifically showing a keyboard 12 that is provided on a projection screen side, and with FIG. 12B specifically showing the keyboard 12 provided on the side opposite the projection screen (i.e., the audience side).
Figure 12:
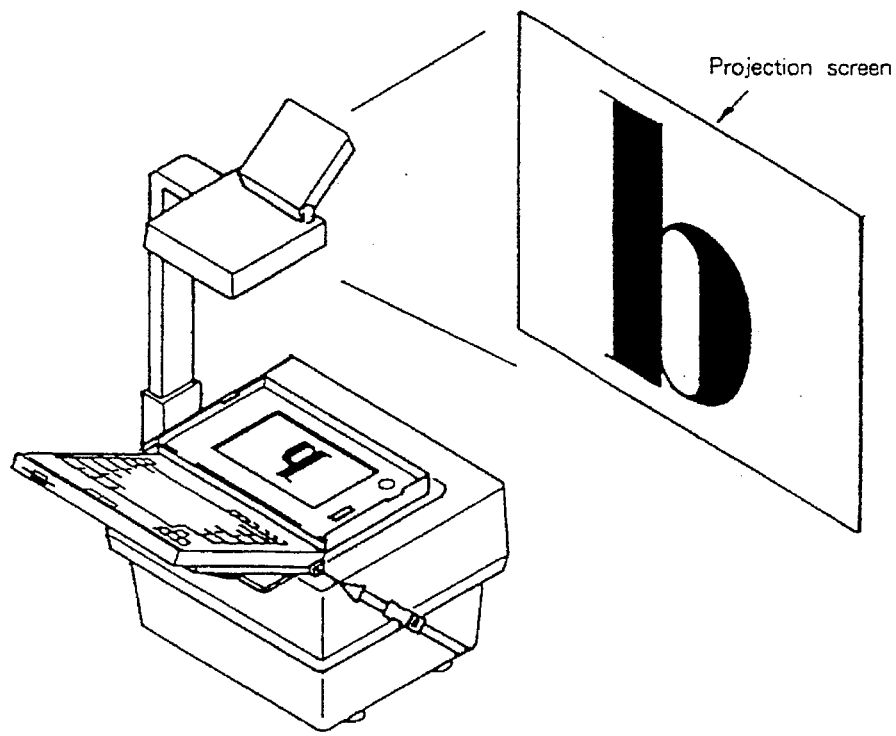

As is apparent from FIG. 11, the stand 20 is a structure by which the table 21 and a base 22 are rotatably supported. More specifically, when the stand 20 is used, the table 21 is opened relative to the base 22 and an arm 24 on the base 22 is positioned upright so that it supports the table 21 at an inclination angle of about 20°, as is shown in FIGS. 11A and 11B. As is shown in FIG. 12, a user merely installs the stand 20, which is opened in the described manner, on an OHP light source section (or more specifically, a user secures it with the strap 40, as will be described in detail later), and mounts the main body (keyboard) 10 of the notebook computer 1 on the OHP device. When the stand 20 is not in use, as is shown in FIG. 11D, the arm 24 is folded down and the table 21 and the base 22 are closed to make the stand 20 compact, so that it can be stored or carried. The detailed structure and the function of the stand 20 will now be described while referring to FIGS. 13 through 15.

Figure 13:
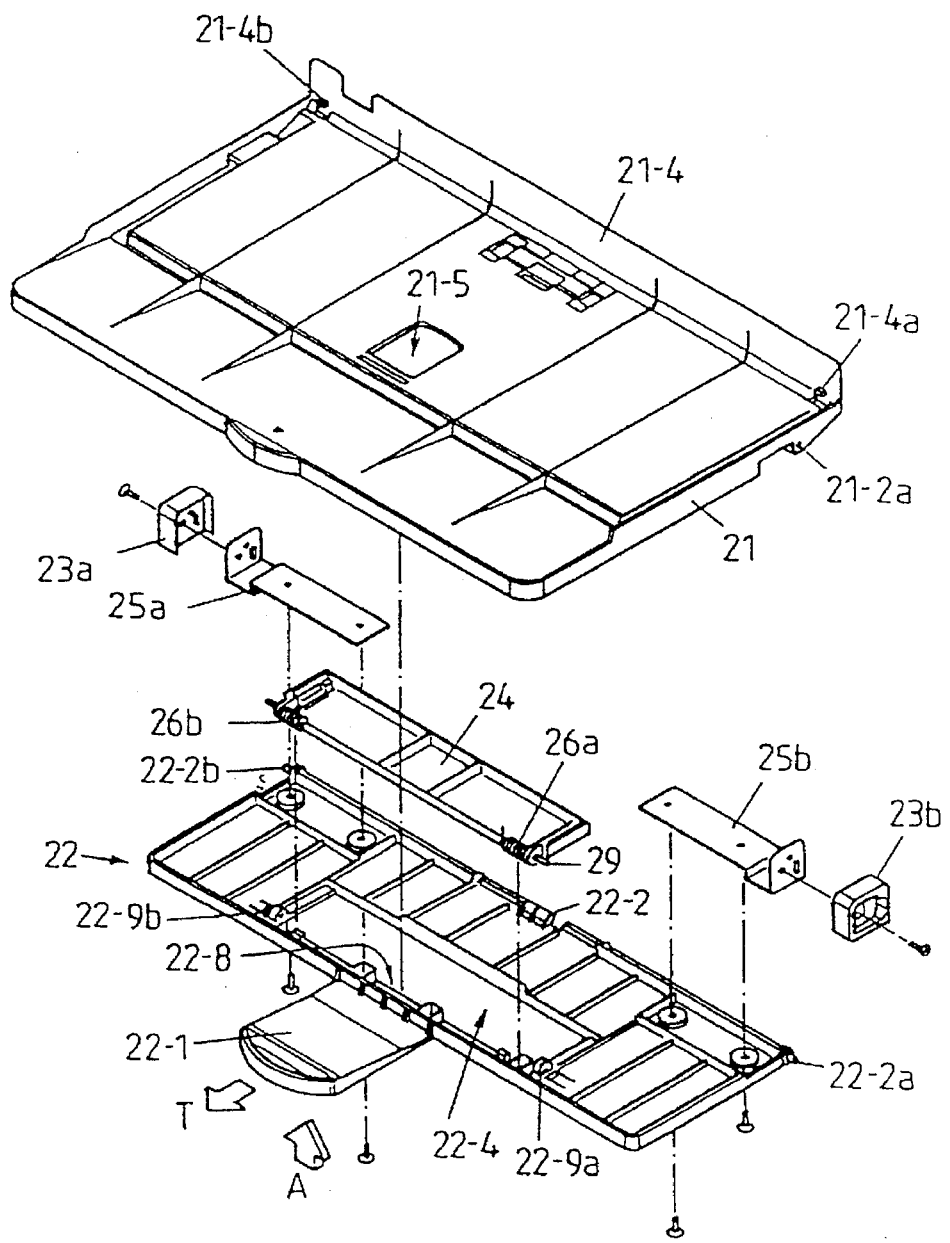
FIG. 13 is an exploded diagram for the stand 20.

FIG. 13 is an exploded diagram of the stand 20.

The base 22 is a nearly flat plate with an integrally formed handle 22-1 that is positioned almost at its front center, and with an opening 22-4 that is formed almost in its center. The handle 22-1 is to be held by a user when disengaging the base 22 from the table 21. A latch 22-8 is provided at the proximal end of the handle 22-1 to engage a latch 21-8, which is formed on the table 21 (the latch 22-8 is not shown in FIG. 13 since it is hidden by a rib; it will be described later while referring to FIGS. 16 and 18). The opening 22-4 is so formed that the tensile strength of the base 22 is reduced in order for the handle 22-1 to be easily bent in the direction indicated by an arrow T, and that the opening 22-4 can serve as the storage place for the arm 24 when the stand 20 is closed (FIG. 11D) (which will be described later). Protruding rods 22-2a and 22-2b, which together act as a shaft to attach the base 22 to the table 21, are formed at the rear and at the respective ends of the base 22, and a ribbed protrusion 22-2 (which will be described later) is formed at the rear and almost in the center of the base 22. Further, crank-shaped brackets 25-a and 25-b are fixed by screws at the right and left rear upper portions of the base 22. Caps 23-a and 23-b that are fixed by screws to the side edge of the respective brackets 25-a and 25-b are employed for the attachment of the strap 40 (the structures of the strap 40 and the caps 23-a and 23-b, and the attachment of the strap 40 will be described later).

A single shaft 29 penetrates and passes through front edge of the arm 24. Both ends of the shaft 29 project from the arm 24, and the projected portions are supported rotatable at the base 22 by bearings 22-9a and 22-9b. A pair of springs 26-a and 26-b are fitted around the shaft 29. The ends of both the springs 26-a and 26-b extend from a winding in a direction perpendicular to each other. Therefore, when the arm 24 and the base 22 are assembled, the springs 26-a and 26-b provide rotational force for the arm 24 in that direction in which the arm 24 rises from the base 22.

The table 21 is an almost flat plate that includes a rear wall 21-4 at its rear and an opening 21-5 that is almost in its center. The rear wall 21-4, which is formed almost at an right angle relative to the table 21, contacts and holds the back portion of the mounted notebook computer 1 and prevents the computer 1 from sliding across the inclined face of the table 21. Small protrusions 21-4a and 21-4b are formed on the right and left lower surfaces of the rear wall 21-4. The small protrusions 21-4a and 21-4b engage recess portions (which will be described later) that are formed on the right and left sides of the rear surface of the notebook computer 1. The opening 21-5 is so formed that a user can observe the condition of the arm 24 and can fold the stand 20 by pushing down the arm 24 with his finger through the opening 21-5. Bearings 21-2a and 21-2b are formed in the rear lower sides of the table 21. The protruding rods 22-2a and 22-2b are inserted into the bearings 21-2a and 21-2b to rotatably support the base 22.

Figure 14:
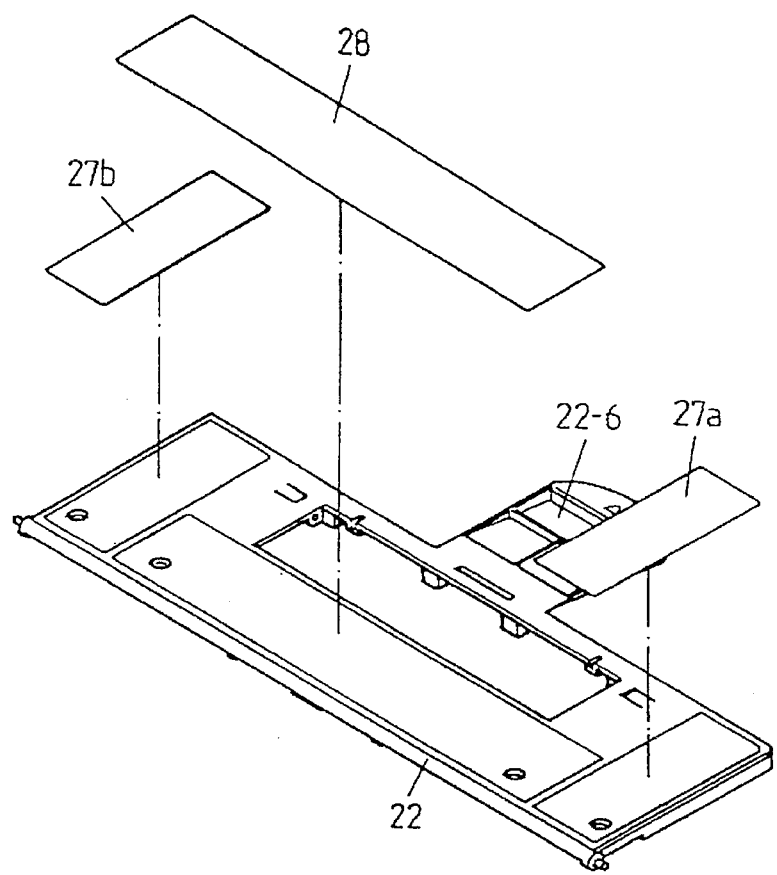
FIG. 14 is a perspective view of a base 22 as viewed from the direction indicated by arrow A in FIG. 13.

FIG. 14 is a perspective diagram of the reverse of the base 22 when it is viewed from the direction indicated by the arrow A in FIG. 13. As is easily apparent from FIG. 12, the reverse of the base 22 is where it contacts the OHP light source section. As is shown in FIG. 14, a pair of rubber sheets 27a and 27b and a shield member 28 are adhered to the reverse of the base 22. The rubber sheets 27a and 27b serve as cushioning pads on the glass of the OHP light source section and as a slide preventer. The shield member 28 is made of aluminum foil, for example, and reflects heat that is irradiated by the OHP light source section. Further a recessed portion 22-6 is formed in the reverse of the handle 22-1, so that a user can easily grasp the handle 22-1 with his fingers.

Figure 15:
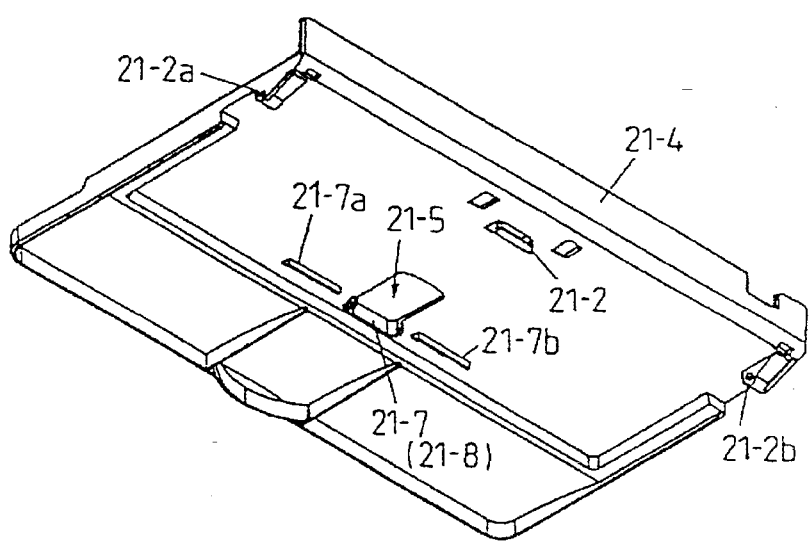
FIG. 15 is a perspective view of a table 21 as viewed from the direction indicated by arrow A in FIG. 13.

FIG. 15 is a perspective view showing the reverse of the table 21, when it is viewed from the direction indicated by the arrow A in FIG. 13. As is shown in FIG. 15, a stopper 21-7 that projects outward almost perpendicularly is formed adjacent to the opening 21-5. Tabs 21-7a and 21-7b are linearly formed to the either side of the stopper 21-7. When the stand 20 is opened, the rear edge of the arm 24 abuts upon the stopper 21-7 and the tabs 21-7a and 21-7b to hold the table 20 open at a predetermined angle (about 20° in this embodiment). A latch 21-8 is formed on the reverse of the stopper 21-7. When the stand 20 is closed, the latch 21-8 engages the latch 22-8 on the base 22 and together they maintain the stand 20 in the closed state (which will be described later). A small shank 21-2, which in cross section has an almost recessed shape, is formed to the rear of the opening 21-5. The small shank 21-2 pivots on the ribbed protrusion 22-2 that is provided on the base 22. At the front and almost in the center of the table 21, space is defined by ribs to accommodate the handle 22-1 of the base 22.

Figure 16:
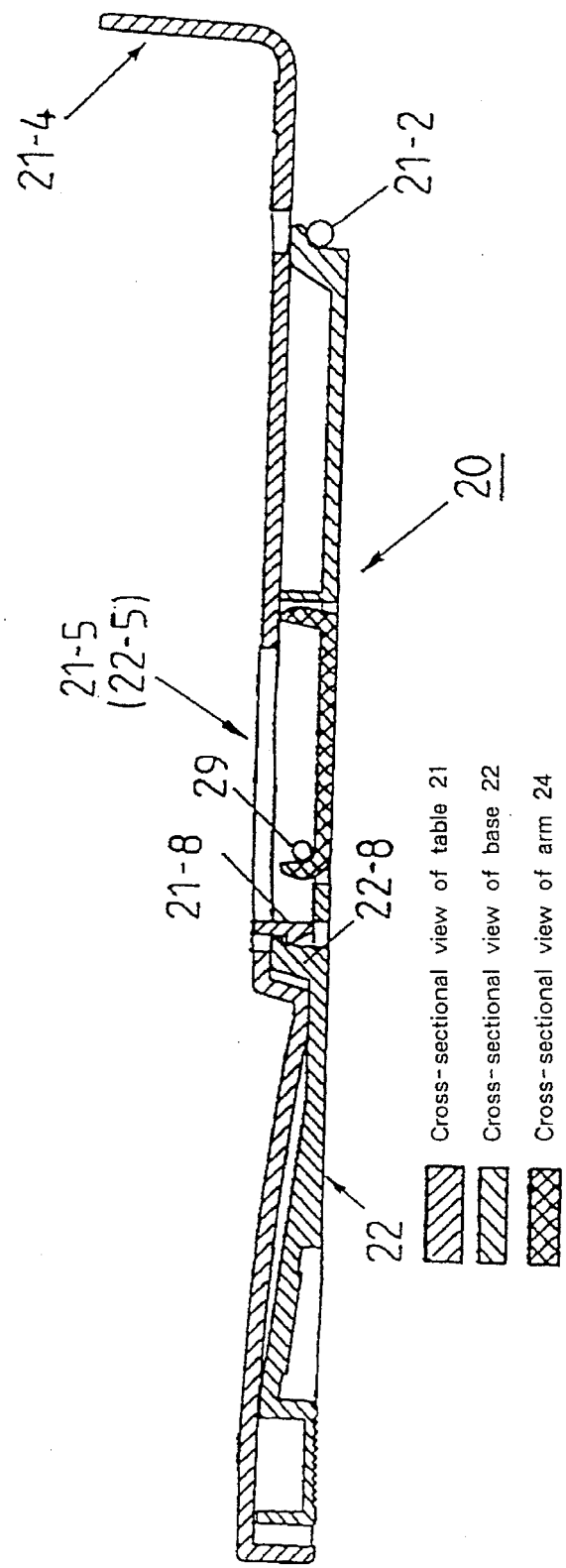
FIG. 16 is a cross-sectional view, taken along the line C—C, of the stand 20 in FIG. 11D (i.e., in the closed state).

FIG. 16 is a cross-sectional view, taken along the line C—C, of the stand 20 shown in FIG. 11D (i.e., in the closed state). Rotational force in the direction in which the arm 24 rises from the base 22 (counterclockwise around the shaft 29 in FIG. 16) is given to the arm 24 by the springs 26-a and 26-b. Repellent force therefore acts on the base 22 and table 21 in the direction in which they are opened (clockwise at the small shank 21-2 in FIG. 16). In FIG. 16, the latch 21-8 of the table 21 engages the latch 22-8 of the base 22, thereby holding the stand 20 closed against the recovery force exerted by the springs 26-a and 26-b. Since, at this time, the arm 24 is stored in the opening 22-5 of the base 22, the table 21 and the base 22 are almost completely closed. Therefore, the stand 20 in the closed state is thin, except for the bent rear edge 21-4, and can be conveniently stored and carried.

Figure 17:
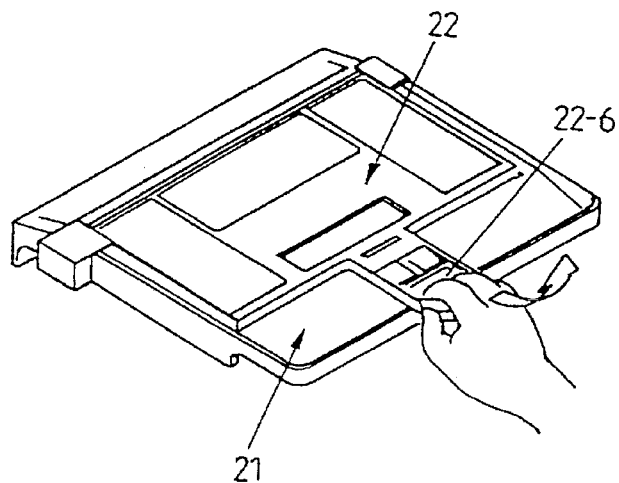
FIG. 17 is a diagram depicting a user opening the stand 20.

The illustration in FIG. 17 describes the state when a user has opened the stand 20. A user inverts the stand 20 and pulls the handle 22-1 to the front relative to the table 21 by grasping the recessed portion 22-6 in the surface of the handle 22-1. Since, as is previously described, the opening 22-5 is almost in the center of the base 22, for which the tensile strength is thereby weakened, the handle 22-1 is bent by the tensile stress and is shifted to the front together with the latch 22-8, which is positioned at the proximal end of the handle 22-1, and the latch 22-8 is disengaged from the latch 21-7. As a result, the arm 24 is raised from the base 22 by the recovery force of the springs 26-a and 26-b, and the table 21 pivots away from the base 22.

FIG. 18 is a cross-sectional view, taken along the line D—D, of the stand 20 shown in FIG. 11A (i.e., in the open state). Since the arm 24 is forced up by the springs 26-a and 26-b, it pivots upward relative to the base 22 in the direction indicated by the arrow U (counterclockwise around the shaft 29 in FIG. 18). The table 21 is hinged at the ribbed protrusion 22-2 and protrusions 22-2a and 22-2b of the base 22 by the small shank 21-2 and by the bearings 21-2a and 21-2b at its rear edge. When the table 21 is pushed up by the arm 24, it is separated from the base 22 at the rear edge as though pivoted on a shaft. As the table 21 is opened, the rear edge of the arm 24 slides across the reverse of the table 21 until it is finally stopped when it abuts upon the stopper 21-7 and the tabs 21-7a and 21-7b. In this condition, since the table 21 is supported from the reverse by the arm 24, it will not close even when a heavy object, such as a notebook computer, is mounted on it. An approximately 20° angle is formed by the base 22 and the table 21 when the stand 20 is open. To close the stand 20, the arm 24 is folded in the direction that is opposite to that which is indicated by the arrow U by slipping a finger through the opening 21-5 while holding the table 21, and then the table 21 is closed and the latch 21-8 engages the latch 22-8 of the base 22.

Figure 19:
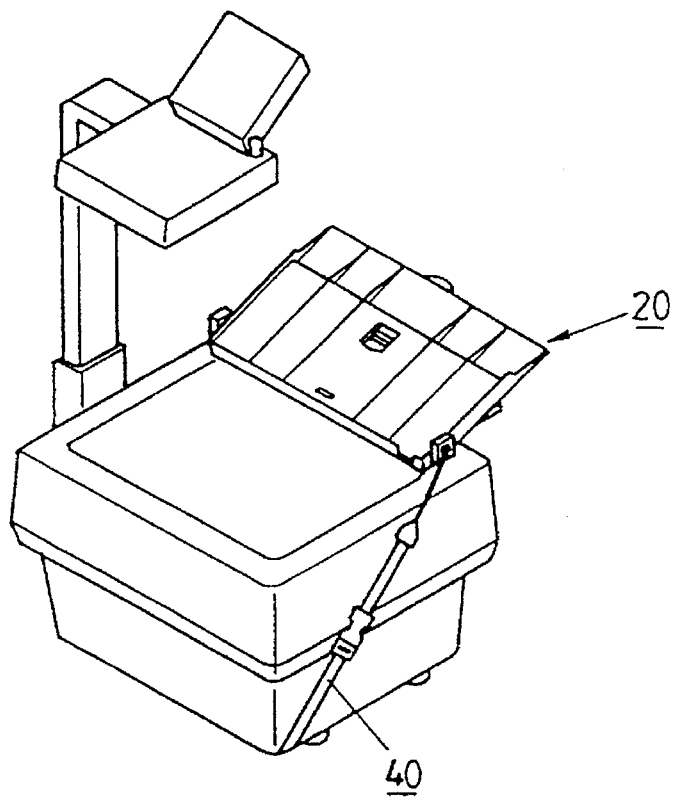
FIG. 19 is a diagram showing the stand 20 after being fixed to the OHP light source section.

The strap 40, which is one of the option, is employed to fasten the stand 20 to the OHP light source section, as is shown in FIG. 19, for example. As is previously described, provided on both sides of the rear of the stand 20 in this embodiment are the caps 23a and 23b to which are connected with the ends of the strap 40. The structure that is fitted into the caps 23a and 23b to secure the ends of the strap 40 will be described in detail later.

Figure 20:
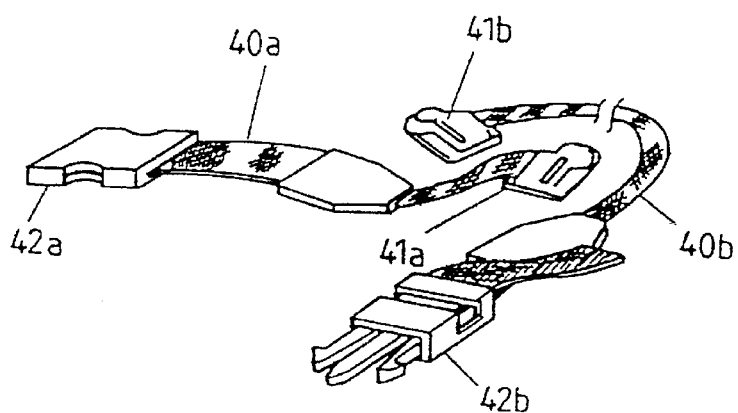
FIG. 20 is a diagram showing a strap 40 that is employed for securing the stand 20 to the OHP light source section.

FIG. 20 is a diagram showing the outline of the strap 40 that is employed to fasten the stand 20. In this embodiment, the strap 40 is separated into right and left portions 40a and 40b. The portions 40a and 40b respectively include locking mechanisms 41a and 41b that can be fitted in the respective caps 23a and 23b, and connectors 42a and 42b that are linked together. The connector 42b includes a mechanism by which the length of the strap 40 can be adjusted.

FIGS. 21A and 21B are perspective views of the locking mechanism 41a, as viewed from the front and from the reverse, respectively. The locking mechanism 41a is constituted by a knob 41a-1 and a base mount 41a-2. The knob 41a-1 has an almost U shape when it is coupled with an almost L-shaped hook that penetrates the base mount 41a-2 from the rear. The base mount 41a-2 has a bracket 41a-3 on the front face that fastens the strap 40, and a protrusion 41a-4 that is formed on its reverse face in the vicinity of the insertion hole for the hook.

Figure 24:
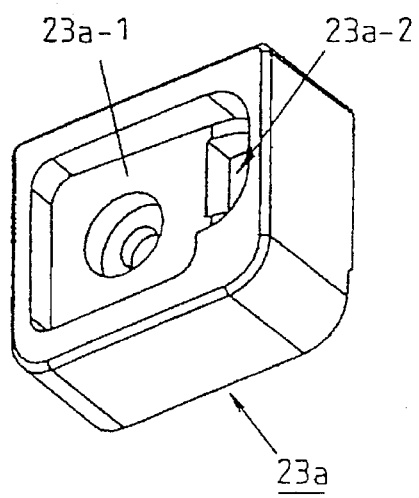

The cap 23a into which the locking mechanism 41a can be fitted is shown in FIG. 24. An opening 23a-1, which has a shape that is almost the same as the base mount 41a-2, is formed in the surface of the cap 23a, and a through hole 23a-2 through which the protrusion 41a-4 can be passed is formed in the bottom in the opening 23a-1.

Figure 21:
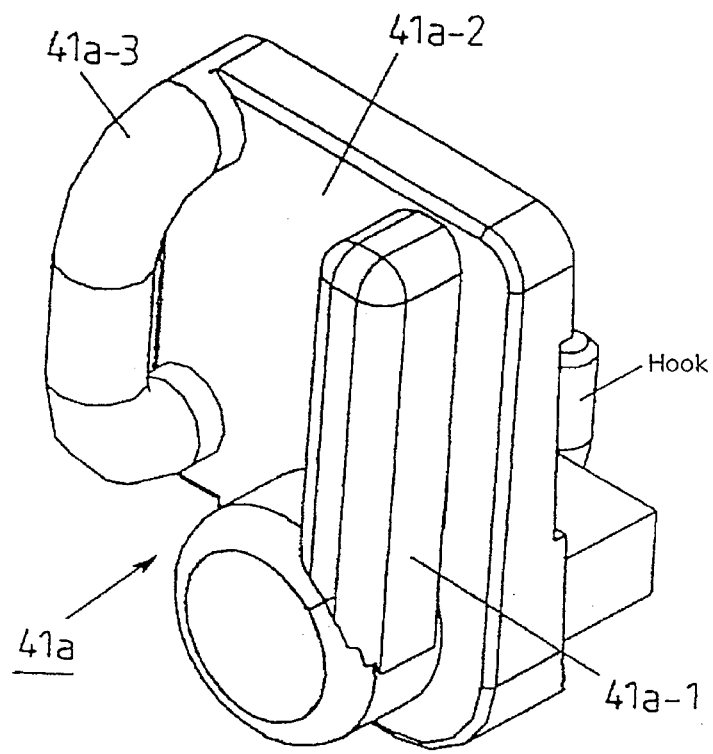
FIGS. 21A and 21B are diagrams illustrating a locking mechanism 41a when a knob 41a-1 is located at an locking position, with FIG. 21A being a perspective view of its obverse side and with FIG. 21B being a perspective diagram of its reverse side.
Figure 21:
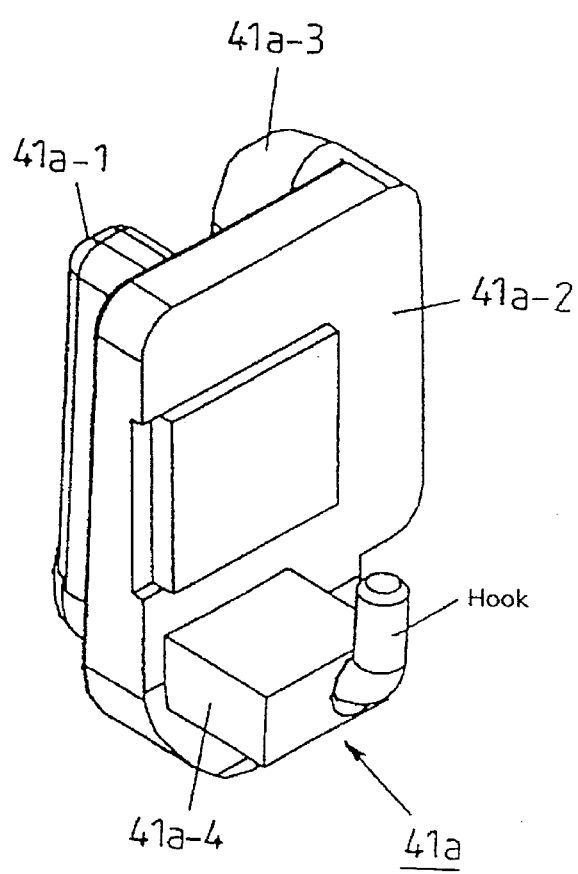
Figure 22:
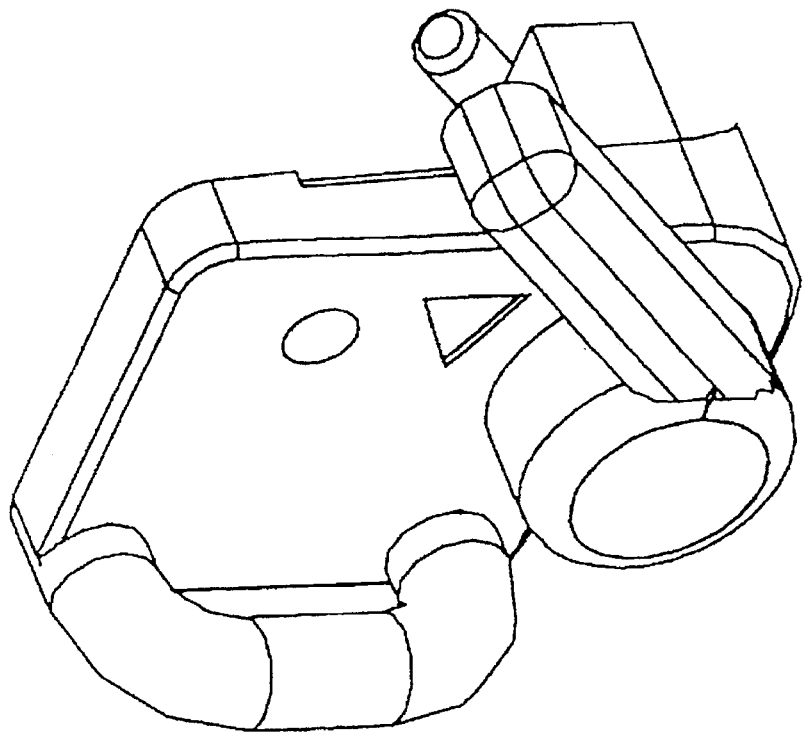
FIGS. 22A and 22B are diagrams illustrating the locking mechanism 41a when the knob 41a-1 is located between the locking position and an insertion position, with FIG. 22A being a perspective view of its obverse side and with FIG. 22B being a perspective diagram of its reverse side.
Figure 22:
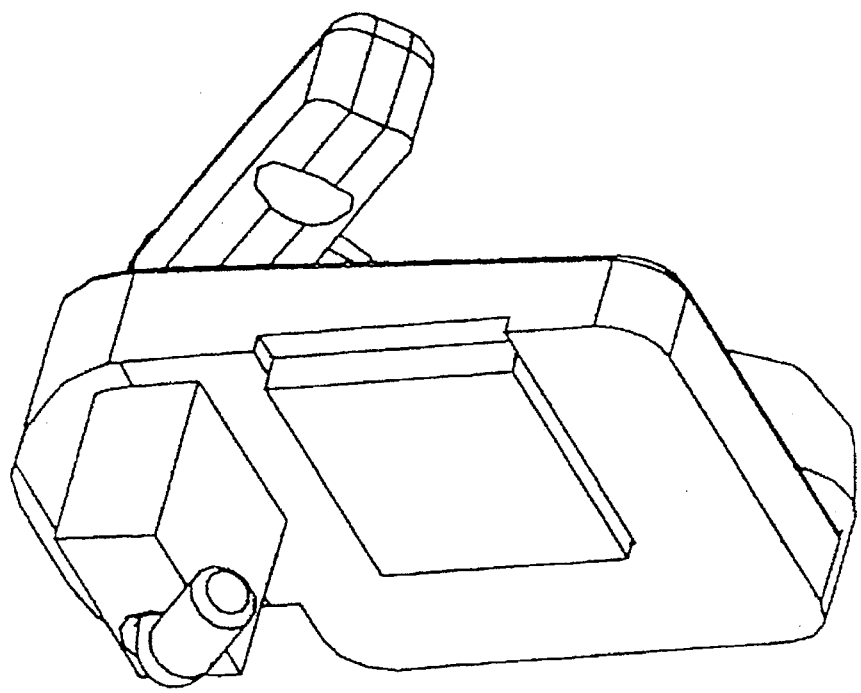
Figure 23:
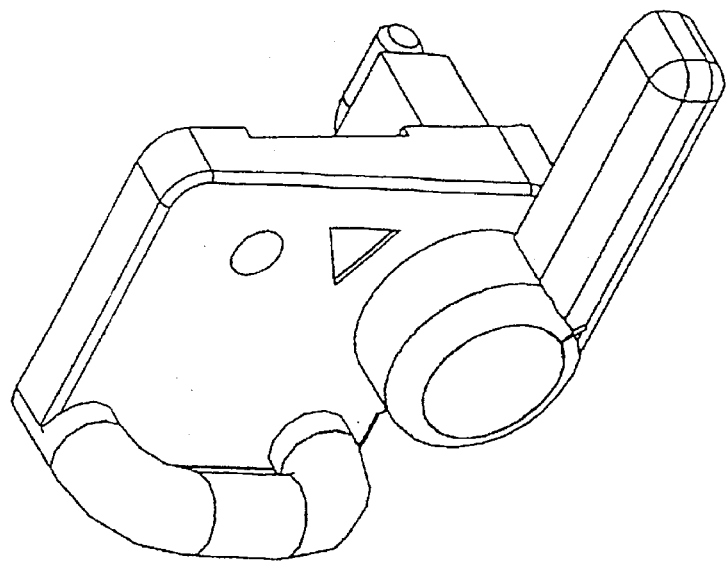
FIGS. 23A and 23B are diagrams illustrating the locking mechanism 41a when the knob 41a-1 is located at an insertion position, with FIG. 23A being a perspective view of its obverse side and with FIG. 23B being a perspective diagram of its reverse side.
Figure 23:
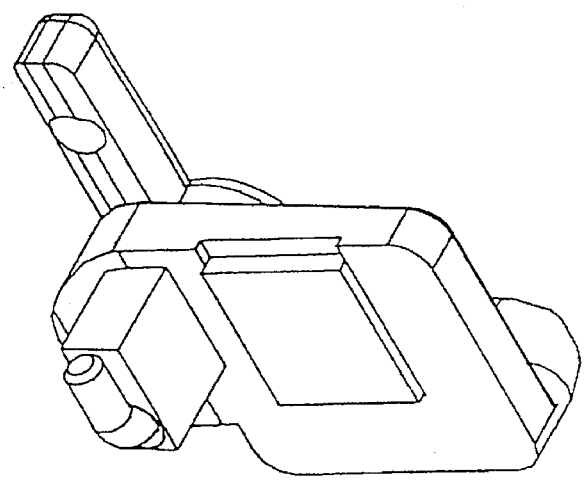

The knob 41a-1 is inserted through the base mount 41a-2 and is rotatable with the hook. The locking mechanism 41a can be inserted into or can engage the cap 23a (in response to the rotation angle of the knob 41a-1). FIGS. 21 through 23 are diagrams showing the knob 41a-1 that is rotated and positioned at several angles. In FIG. 23, the knob 41a-1 is positioned for insertion into the cap 23a (insertion position). As is shown in FIG. 23B, the hook at the insertion position is included within the outline of the protrusion 41a-4 of the base mount 41a-2. When the base mount 41a-2 is inserted into the opening 23a-1, the protrusion 41a-4 engages the through hole 23a-2 and the hook reaches the reverse of the cap 23a. Since a comparatively large cavity (not shown) exists at the reverse of the through hole 23a-2, the hook can be rotated after it is engaged. When the knob 41a-1 is rotated counterclockwise, as is shown in FIG. 22A, the hook extends out over the outline of the protrusion 41a-4. As is shown in FIG. 21(b), at the position (engagement position) at which the knob 41a-1 is located by rotating it 90° from the insertion position, the hook is extended to its furthest point outside the outline of the protrusion 41a-4, and the force with which the hook engages the reverse of the cap 23a is at the maximum. It would therefore be understood that this position is the most appropriate for engagement.

It should be noted that, although not illustrated, the locking mechanism 41b and the cap 23b are formed symmetrically with the locking mechanism 41a and cap 23a and have the same functions.

Figure 25:
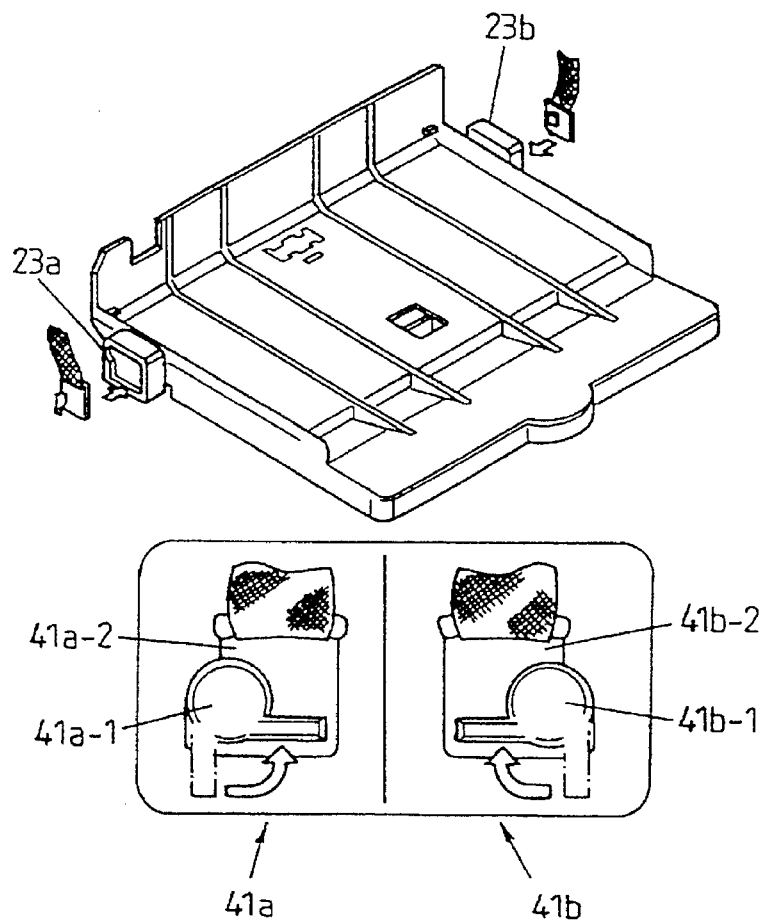
FIG. 25 is a diagram illustrating how the strap 40 is attached to the stand 20, illustrating how the locking mechanisms 41a and 41b engage the individual caps 23a and 23b.
Figure 26:
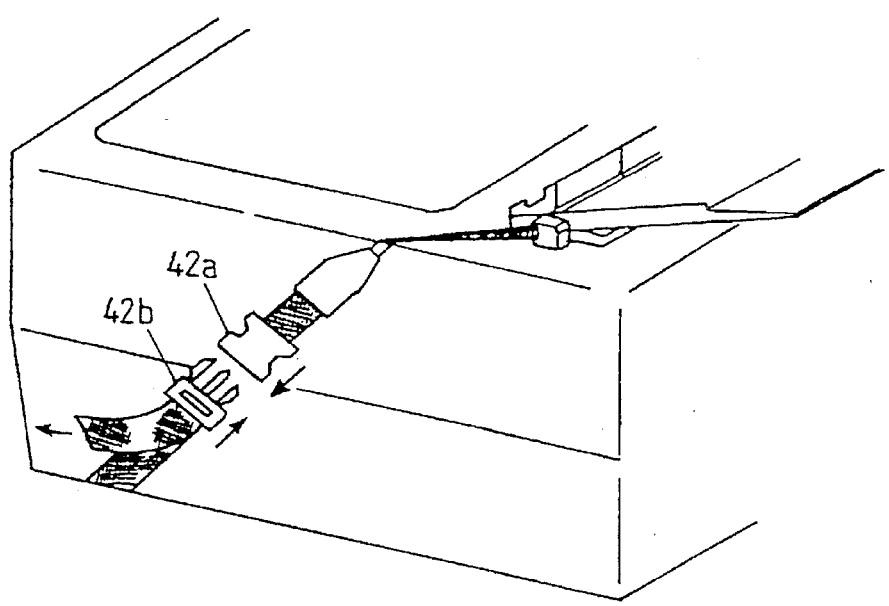
FIG. 26 is a diagram showing the attachment of the strap 40 to the stand 20, and more specifically, showing the coupling of the connectors 42a and 42b of the strap 40 and the adjustment of their length.

FIGS. 25 and 26 are diagrams of the strap 40 that is being attached to the stand 20. As is previously described, the caps 23a and 23b are secured by screws at the rear end on either side of the base 22 of the stand 20. A user first matches the knobs 41a-1 and 41b-1 of the locking mechanisms 41a and 41b, at the two ends of the strap 40, with the insertion positions. Then, the user inserts the base mounts 41a-2 and 41b-2 into the openings 23a-1 and 23b-1 of the caps 23a and 23b, respectively, and turns the knobs 41a-1 and 41b-1 to the engagement position (FIG. 25). Finally, the user couples the connectors 42a and 42b together, adjusts the length of the strap 40, and securely fastens the strap 40 to the OHP device (FIG. 26).

Figure 27:
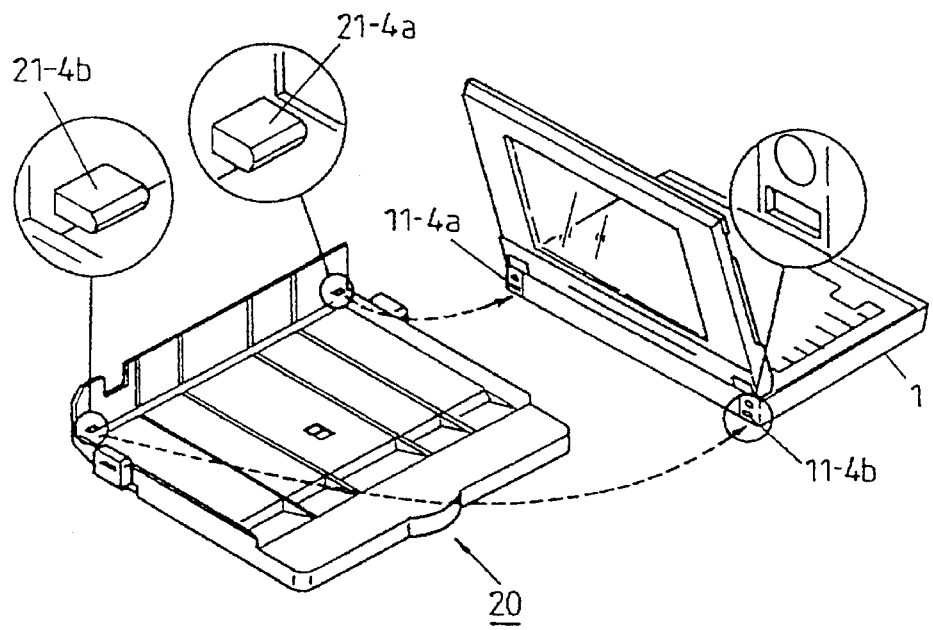
FIGS. 27A and 27B are diagrams showing how to mount the notebook computer 1 on the stand 20, with FIG. 27A being a diagram that shows the notebook computer 1 mounted on the table 21, and with FIG. 27B being a diagram that shows the adjustment of the degree of opening of the lid 50.
Figure 27:
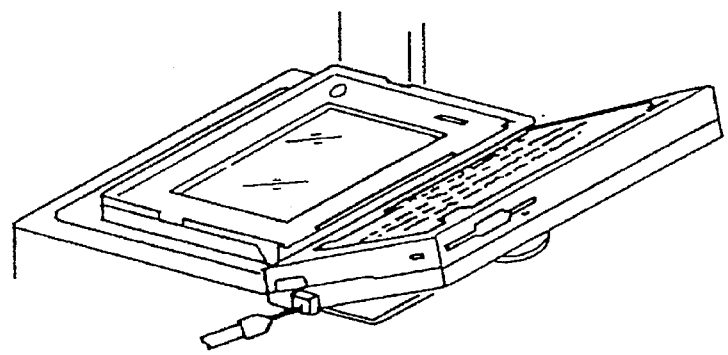

FIG. 27 is a diagram showing the notebook computer 1 in the process of being mounted on the stand 20. As is previously described, the small protrusions 21-4a and 21-4b are formed on the right and left ends of the rear wall 21-4 of the table 21. Corresponding small holes 11-4a and 11-4b are formed in the both ends of the back face of the notebook computer 1 so that they can engage the small protrusions 21-4a and 21-4b. The small holes 11-4a and 11-4b are matched with the small protrusions 21-4a and 21-4b and the notebook computer 1 is mounted on the table 1. Then, when the notebook computer 1 is pressed against the rear wall 21-4 by its own weight, it is prevented from shifting along the rear wall 21-4 by the small protrusions 21-4a and 21-4b. When the notebook computer 1 has been placed on the table 21, the user may adjust the opening of the lid 50 so that the liquid crystal display panel 52 is parallel to the glass of the OHP light source device.

The main advantages of the installation example 1, which has been explained in this article, are as follows:

(1) When the notebook computer 1 is mounted on the OHP device, the main body 10 can be kept away from the OHP light source section, and thus an electric circuit in the main body 10 can be protected from the heat that is irradiated by the light source. Further, since the main body 10 is inclined at an angle of only about 20° relative to the horizontal face and is not positioned high, it will interfere very little with the field of vision of the audience who are looking at an OHP screen. In addition, since the front edge of the keyboard 12 is positioned only a little higher than the rear edge, a presenter can use the keyboard to input data.

(2) Since the installation of the notebook computer 1 on the OHP device basically relies on the stand 20, the design of the components of the notebook computer 1 do not have to be substantially altered. When a presenter leaves the stand 20 fastened to the OHP device and removes only his notebook computers 1, the next presenter can smoothly begin his presentation.

(3) In this embodiment, the height of the liquid crystal display panel 52 from the OHP light source section is $h \times \sin 20°$ (wherein h denotes the thickness of the main body 10). Therefore, compared with the prior art where a liquid crystal display panel is directly placed on an OHP light source section (e.g., Japanese Unexamined Utility Model Publication No. Sho 64-121 wherein a liquid crystal display panel is removed and placed on an OHP light source section or Japanese Unexamined Patent Publication No. Hei 04-16824 wherein a keyboard rises upright and when a display is placed on an OHP light source section), according to the installation example 1, light from the OHP light source section can be focused at the height $h \times \sin 20°$. The liquid crystal display panel 52 can be installed lower than when the main body and lid are opened almost horizontally and placed on an OHP light source section (e.g., German Unexamined Patent Publication No. 4019755) by a distance that is the equivalent of the amount of inclination of the main body 10 when the table 21 is used, i.e., $\Delta h = h (1 - \sin 20°)$. As a result, the liquid crystal display panel can be positioned within the focusing range of the OHP device.

(4) The stand 20 is fastened to the OHP device by the strap 40. Since the strap 40 is made of soft material and its length can be adjusted, differences in shapes and sizes of OHP devices can be coped with. In other words, this embodiment can be employed with almost all the OHP devices that are available on the market.

C-2. Installation Example 2

Figure 28:
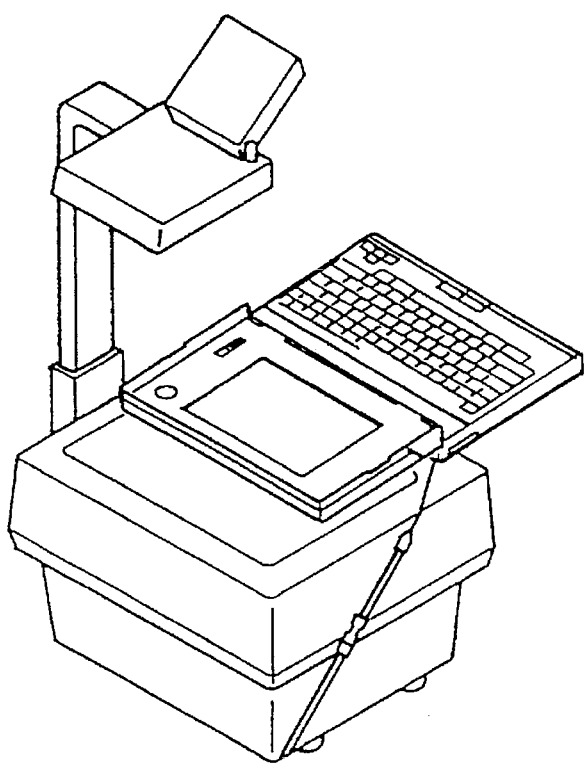
FIG. 28 is a diagram illustrating the notebook computer 1 with the lid 50 opened until it is almost horizontal to the main body 10 that is mounted directly on the OHP device.

As is shown in FIG. 28, in the second installation example, the notebook computer 1, of which the main body 10 and the lid 50 are opened almost horizontally, is directly placed on an OHP device. In this case, as well as in article C-1, for safety reasons it is preferable that the strap 40 be employed to fasten the notebook computer 1 to the OHP device.

Figure 29:
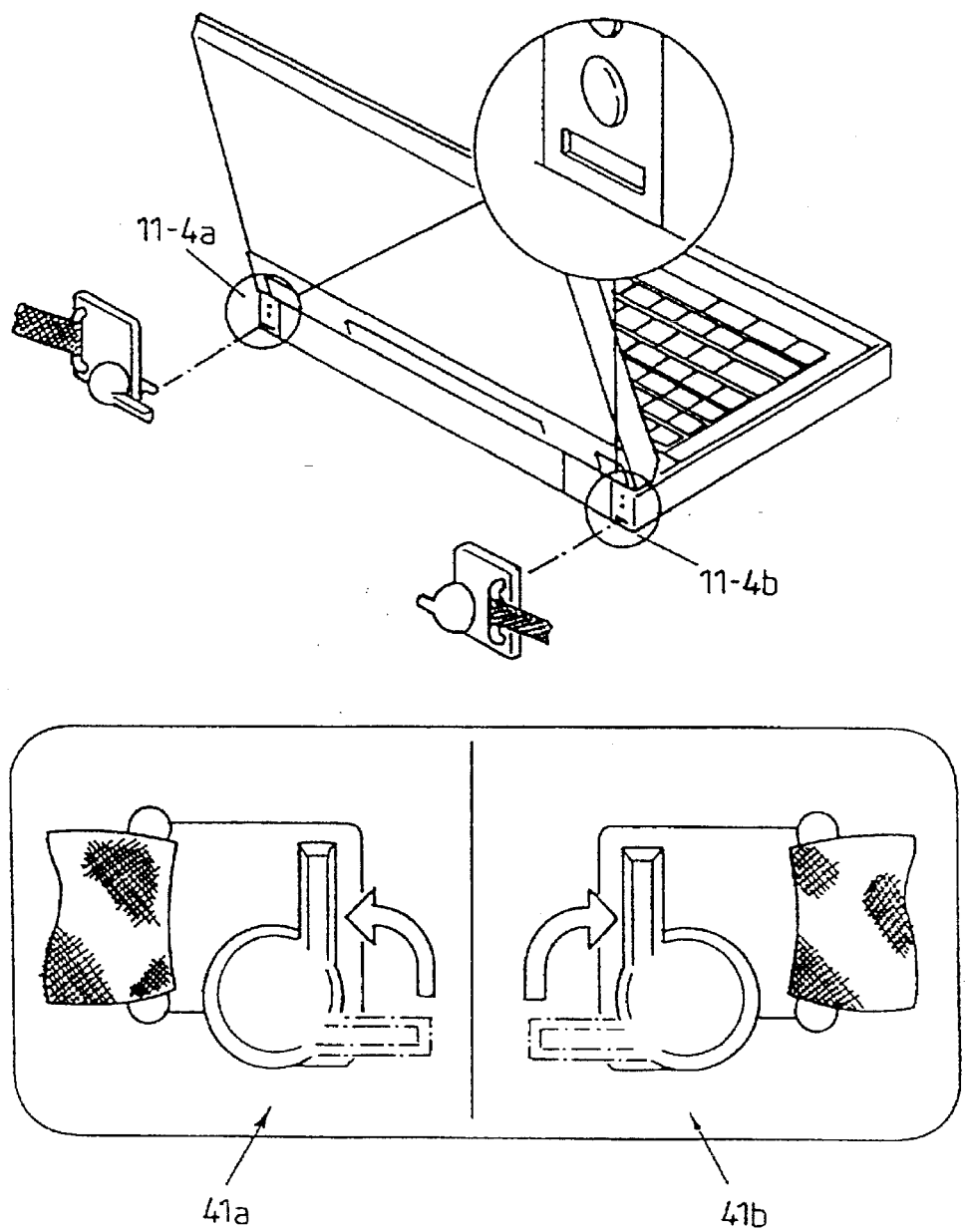
FIG. 29 is a diagram showing the attachment to the notebook computer 1 of the locking mechanisms 41a and 41b of the strap 40.

The illustration in FIG. 29 shows the attachment of the locking mechanisms 41a and 41b of the strap 40 to the notebook computer 1. As is previously described, the small holes 11-4a and 11-4b are formed in the right and left ends of the back face of the notebook computer 1. Further, comparatively large cavities (not shown) are formed behind the small holes 11-4a and 11-4b.

When the knobs 41a-1 and 41b-1 are set to their insertion positions, the protrusions 41a-4 and 41b-4 can be inserted into the small holes 11-4a and 11-4b. After the insertion, the knobs 41a-1 and 41b-1 are turned 90° to the engagement positions, so that the locking mechanisms 41a and 41b are securely fixed to the notebook computer 1.

When an angle adjusting mechanism is provided on the bottom of the main body 10 to raise the front edge higher than the rear edge, the main body 10 is supported above the OHP light source section, as in article C-1. Since a mechanism that supports an inclined keyboard is already well known, it would be understood by one having ordinary skill in the art that it is easy for an angle adjusting mechanism that supports a declined keyboard to be easily provided on the bottom of the main body.

The strap 40 can be used also as a shoulder belt when the notebook computer 1 is being carried.

D. Presentation Employing a Notebook Computer

FIG. 12 is a diagram showing the installation of the notebook computer 1 on an OHP device using the stand 20. The notebook computer 1 may be positioned with the keyboard 12 directed toward a projection screen, as is shown in FIG. 12A, or with the keyboard 12 directed toward the opposite side (i.e., the audience side), away from the projection screen, as is shown in FIG. 12B. In either case, the strap 40 can cope with the differences in shapes and sizes of OHP devices.

As is shown in FIG. 12A, when the keyboard 12 faces the projection screen, the direction in which the liquid crystal display panel 52 usually displays corresponds to that of the projection screen. Thus, as is shown in FIG. 12A, when a character "a" is displayed on the liquid crystal display panel 52 in the normal direction, the character is projected onto the screen in the correct direction.

When a presenter can not stand between the OHP device and the projection screen, the keyboard 12 need only be installed facing the audience, as is shown in FIG. 12B. In this case, when an image that is turned 180° is displayed on the liquid crystal display panel 52, it is projected onto the projection screen in the correct direction (see character "b" in FIG. 12B). The function of rotating the display contents by 180° can be implemented by using a well known technique, such as the inverse reading of a screen buffer. It would be anticipated that the installation of the notebook computer 1 as is shown in FIG. 12B would be convenient for such reasons as the distance between an OHP device and a projection screen is short due to the size of a meeting room, a presenter intercepts the projection light, and the light from a light source strikes a presenter.

In an environment where an OHP device is used, frequently, room lights are dimmed to make projection images clear. It is anticipated that a presenter will scarcely be able to see objects that are near at hand and will have difficulty using a keyboard for input. In this embodiment, therefore, the characters on the keys are printed with luminescent ink or with fluorescent ink (not shown).

E. Appendix

The present invention has been described in detail by referring to a specific embodiment. It would, however, be obvious to one having ordinary skill in the art that various modifications of the embodiments would fall within the scope of the present invention. For example, although a notebook computer is employed for the embodiment of the present invention, another portable information processing apparatus (e.g., a word processor or another OA machine) can be used to realize the present invention. In other words, although the present invention is disclosed using the examples, it should not be limited to them. To understand the subject of the present invention, claims should be referred to that were described the beginning.

As is described above in detail, according to the present invention, it is possible to provide a portable information processing apparatus, wherein a lid is hinged with a main body at the rear edge so as to be rotatable, that can be employed with an overhead projector (OHP device) by using a liquid crystal display panel as a projection transparency, and to provide a stand for the installation of such a portable information processing apparatus.

We claim:

1. An overhead projector and portable computer assembly, said assembly comprising in combination:

an overhead projector including a horizontal projection surface upon which projection media can be placed;

a portable computer including a keyboard housing, a display housing, and a hinge rotatably connecting said keyboard housing to said display housing, said display housing including a display screen having a viewing surface and an opposing surface, said display housing including means for attaching a cover to said display housing adjacent said opposing surface of said display screen such that said portable computer can be operated in a back lighted display mode wherein a cover is attached to said display housing, and a transparent mode wherein a cover is detached from said display housing;

a strap attaching said portable computer to said overhead projector such that said display housing is positioned over said horizontal projection surface of said overhead projector for operation of said portable computer in said transparent mode; and a tilting mechanism detachably connected to said portable computer for tilting and holding said keyboard housing at an acute angle relative to said horizontal surface of said projection surface of said overhead projector.

2. A portable computer for use with an overhead projector having a horizontal projection surface upon which projection media can be placed, said portable computer comprising:

a keyboard housing, a display housing, and a hinge rotatably connecting said keyboard housing to said display housing, said display housing including a display screen having a viewing surface and an opposing surface, said display housing including a cover and means for attaching said cover to said display housing adjacent said opposing surface of said display screen, such that said portable computer can be operated in a back lighted display mode wherein said cover is attached to said display housing, and a transparent mode wherein said cover is detached from said display housing;

a strap for attaching said portable computer to the overhead projector such that said display housing is positioned over said horizontal projection surface of the overhead projector for operation of said portable computer in said transparent mode; and a tilting mechanism detachably connected to said portable computer for tilting and holding said keyboard housing at an acute angle relative to said horizontal surface of said projection surface when said portable computer is attached to the projection surface of said overhead projector.

\* \* \* \* \*